United States Patent [19]

Inaba et al.

[11] Patent Number: 4,580,256

[45] Date of Patent: Apr. 1, 1986

[54] AUTOMATIC DISC LOADING APPARATUS

[75] Inventors: Shizuo Inaba; Kiyoshi Sato; Yoshio Takahashi; Hideyuki Takahashi, all of Tokorozawa, Japan

[73] Assignee: Pioneer Electronic Corporation, Tokyo, Japan

[21] Appl. No.: 697,906

[22] Filed: Feb. 4, 1985

Related U.S. Application Data

[62] Division of Ser. No. 447,785, Dec. 8, 1982, Pat. No. 4,539,670.

[30] Foreign Application Priority Data

Dec. 9, 1981 [JP] Japan ............................. 56-198286
Dec. 9, 1981 [JP] Japan ............................. 56-198291
Dec. 9, 1981 [JP] Japan ............................. 56-198301

[51] Int. Cl.[4] .................. G11B 25/04; G11B 1/00; G11B 3/60; G11B 17/02
[52] U.S. Cl. ................................. 369/77.1; 369/194
[58] Field of Search ................. 369/77.1, 75.2, 194

[56] References Cited

U.S. PATENT DOCUMENTS

| | | | |
|---|---|---|---|
| 2,905,475 | 9/1959 | Cheeseboto | 369/77.1 |
| 2,943,861 | 7/1960 | Redfield | 369/77.1 |
| 3,658,347 | 4/1972 | Cheeseboto | 369/77.1 |
| 4,347,596 | 8/1982 | Abe et al. | 369/75.2 |
| 4,410,971 | 10/1983 | Eisemann | 369/75.2 |
| 4,455,637 | 6/1984 | Suzuki et al. | 369/77.1 |

FOREIGN PATENT DOCUMENTS

| | | | |
|---|---|---|---|
| 234753 | 2/1960 | Austria | 369/77.1 |
| 56-58167 | 5/1981 | Japan | 369/75.2 |
| 56-58168 | 5/1981 | Japan | 369/75.2 |
| 58-60455 | 4/1983 | Japan | 369/77.1 |

Primary Examiner—Steven L. Stephan
Attorney, Agent, or Firm—Schwartz, Jeffery, Schwaab, Mack, Blumenthal & Evans

[57] ABSTRACT

An automatic disc loading apparatus for an information reproducing or recording/reproducing system in which pieces of information recorded on a record disc are to be reproduced or pieces of information are recorded on a record disc and thereafter reproduced. The apparatus comprises a casing structure into which the record disc is to be inserted in a predetermined direction along a predetermined plane substantially parallel with the predetermined direction toward a predetermined position within the casing structure. The casing structure is formed with a slot elongated in a direction substantially perpendicular to the aforesaid predetermined direction. A disc guide is provided comprising a pair of disc guide members movable toward and away from each other within the casing structure and in the neighborhood of the above mentioned slot substantially symmetrically with respect to the above mentioned predetermined direction. The record disc is passed between the disc guide members when being inserted in the predetermined direction into the casing structure through the slot. A drive is operative to drive the disc guide members for movement toward or away from each other.

7 Claims, 25 Drawing Figures

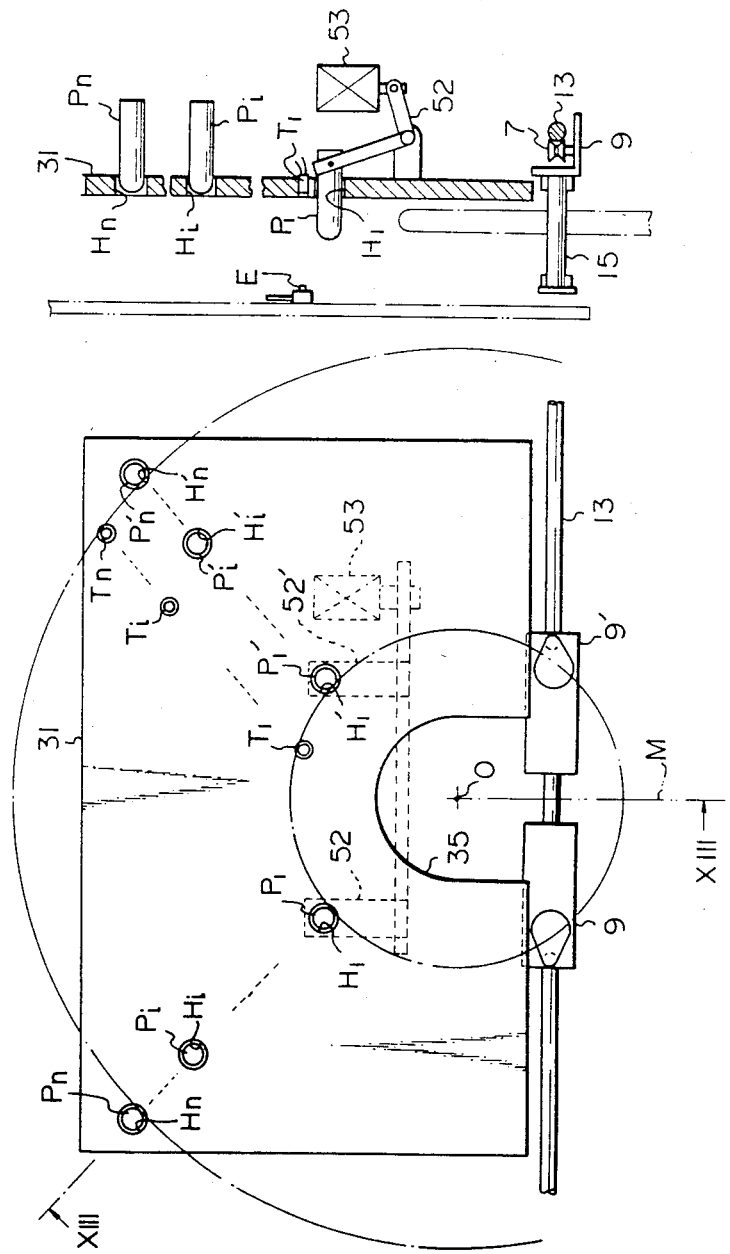

AUTOMATIC DISC LOADING APPARATUS

This is a division of application Ser. No. 447,785 filed Dec. 8, 1982, and now U.S. Pat. No. 4,539,670.

FIELD OF THE INVENTION

The present invention relates to an automatic disc loading apparatus for an information reproducing or reproducing/recording apparatus in which pieces of information recorded on a record disc are to be reproduced or pieces of information are to be recorded on a record disc and thereafter reproduced.

BACKGROUND OF THE INVENTION

An automatic disc loading apparatus is used for loading a record disc on an information reproducing system or an information recording and reproducing system and withdrawing the disc from the apparatus.

Record discs presently available for use on an information reproducing or recording/reproducing system include videos discs and digital audio discs. The digital audio discs are commonly known as "compact discs" and usually measure about 12 centimeters in diameter. Thus, discs to be put to use on an information reproducing or recording/reproducing system may have various outside diameters and thicknesses and center holes with various diameters. An automatic disc loading apparatus is required to cope with record discs of such various sizes and types. An object of the present invention is to provide an automatic disc loading apparatus to satisfy such a requirement.

SUMMARY OF THE INVENTION

In accordance with the present invention, there is provided an automatic disc loading apparatus for an information reproducing or recording/reproducing system in which pieces of information recorded on a record disc are to be reproduced or pieces of information are recorded on a record disc and thereafter reproduced, comprising a casing structure into which the record disc is to be inserted in a predetermined direction along a predetermined plane substantially parallel with the predetermined direction toward a predetermined position within the casing structure. The casing structure is formed with a slot elongated in a direction substantially perpendicular to the aforesaid predetermined direction. A disc guide means is provided comprising a pair of disc guide members movable toward and away from each other within the casing structure and in the neighborhood of the above mentioned slot substantially symmetrically with respect to the above mentioned predetermined direction. The record disc is passed between the disc guide members when being inserted in the predetermined direction into the casing structure through the slot. Drive means are operative to drive the disc guide members for movement toward or away from each other. An apparatus according to the present invention may further comprise a pair of disc detecting means movable with the disc guide members, respectively, and operative to detect the presence of a record disc being inserted into the casing structure through the slot and to produce signals indicative of the presence of the record disc. The drive means are responsive to the signals and are operative to drive the disc guide members for movement toward or away from each other in accordance with the signals.

BRIEF DESCRIPTION OF THE DRAWINGS

The features and advantages of a automatic disc loading apparatus according to the present invention will be more clearly appreciated from the following description taken in conjunction with the accompanying drawings in which:

FIG. 12 is a schematic plan view showing the arrangement of disc stop means forming part of the apparatus embodying the present invention;

FIG. 13 is a vertical sectional view taken along line XIII—XIII in FIG. 12 and showing drive means for the disc stop means;

DESCRIPTION OF THE PREFERRED EMBODIMENTS

Figure 1:
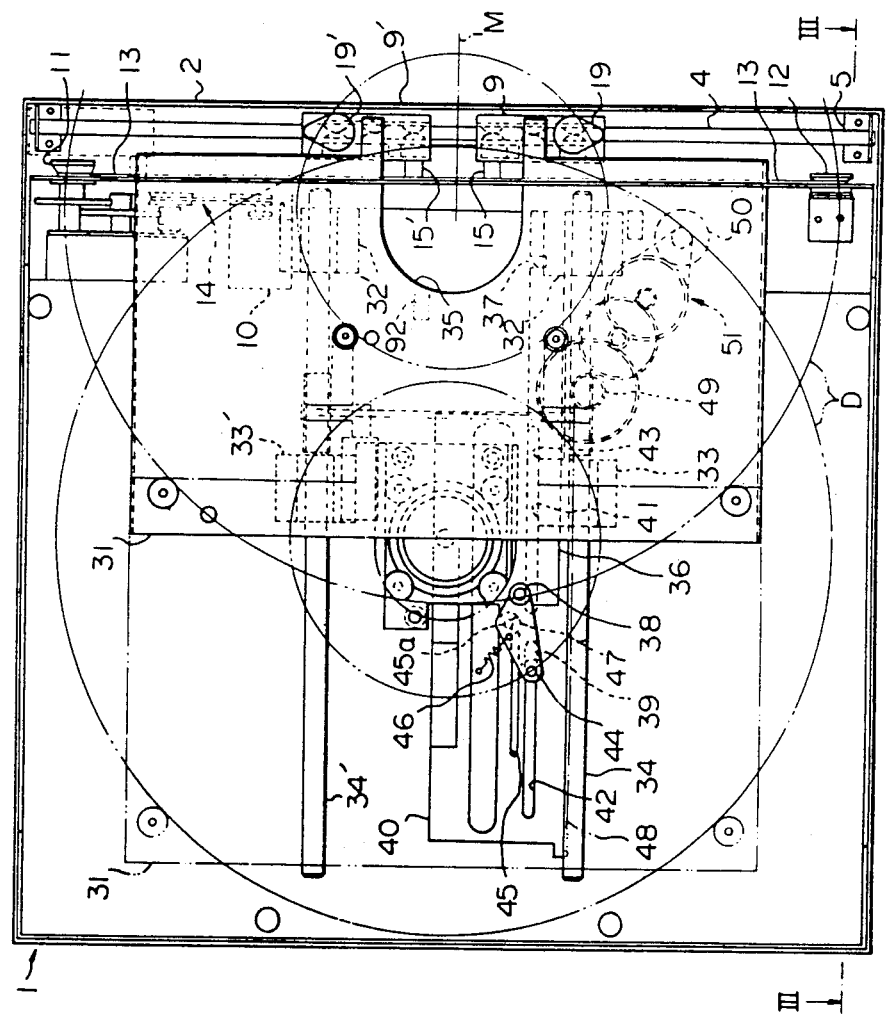
FIG. 1 is a plan view showing a preferred embodiment of an automatic disc loading apparatus according to the present invention.
Figure 2:
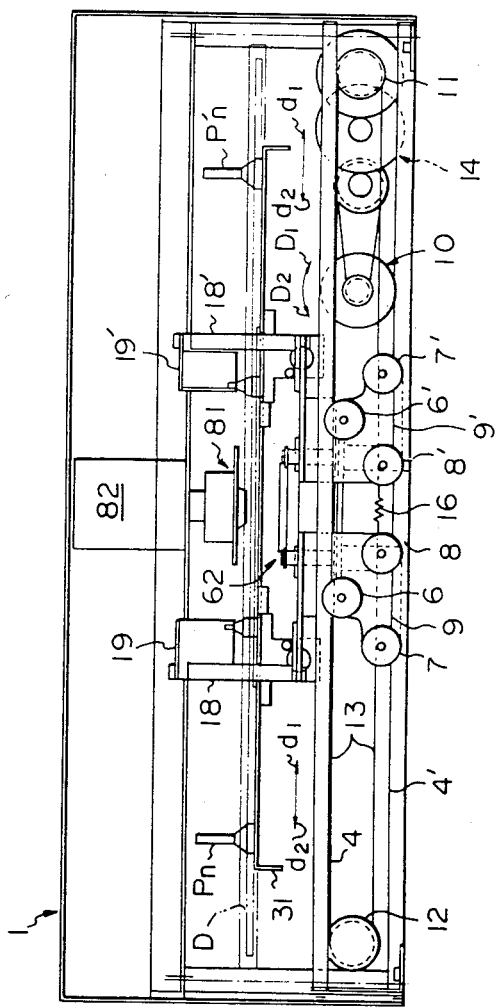
FIG. 2 is a view showing the apparatus as viewed from a plane indicated by arrows II—II in FIG. 1.
Figure 3:
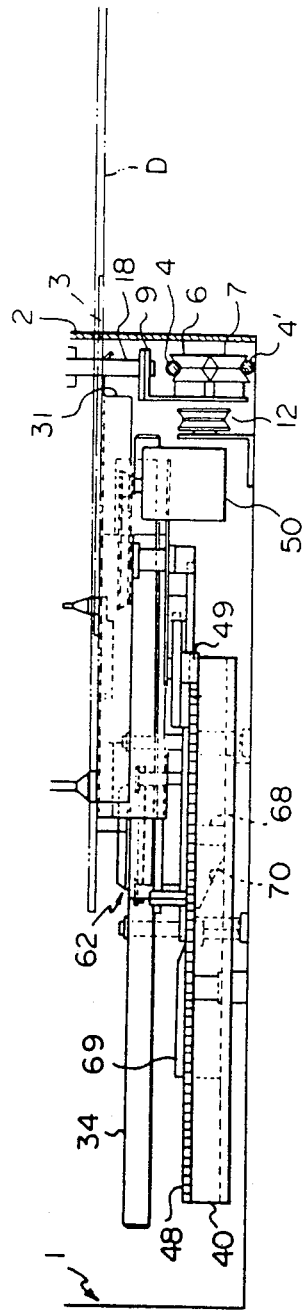
FIG. 3 is a front end view of the apparatus illustrated in FIG. 1.

Referring to FIGS. 1 to 3 of the drawings, an automatic disc loading apparatus embodying the present invention comprises a generally box-shaped casing structure 1 having a vertical front panel portion 2 formed with a laterally elongated slot 3 through which a record disc D is to be inserted into the casing structure 1. The slot 3 has a longitudinal middle point aligned with the axis of rotation of the record disc D in the casing structure 1 and contains a horizontal plane normal to the panel portion 2 and perpendicular to the axis of rotation of the disc D. The casing structure 1 thus has a vertical center plane M which contains the axis of rotation of the disc 8 in the casing structure 1 and which passes through the longitudinal middle point of the slot 3.

Behind the front panel portion 2 of the casing structure 1 is provided disc guide means adapted to guide the record disc D to move through the slot 3 toward a predetermined position in the casing structure 1. Such disc guide means comprises upper and lower parallel guide rods 4 and 4' extending in parallel with the slot 3 and secured at their respective opposite ends to right and left bracket members 5 and 5', respectively, which are secured to the side panel portions of the casing structure 1. The disc guide means further comprises a first set of three guide rollers 6, 7 and 8 and a second set of three guide rollers 6', 7' and 8'. The guide roller 6 is rollable on the upper guide rod 4 and the guide rollers 7 and 8 are rollable on the lower guide rod 4' and, likewise, the guide roller 6' is rollable on the upper guide rod 4 and the guide rollers 7' and 8' are rollable on the lower guide rod 4', as will be best seen from FIG. 2. The first set of guide rollers 6, 7 and 8 are respectively rotatable on shafts secured to a first carriage member 9 and, similarly, the second set of guide rollers 6', 7' and 8' are respectively rotatable on shafts secured to a second carriage member 9'. The carriage members 9 and 9' are driven to move toward and away from each other by drive means including a reversible drive motor 10, circumferentially grooved driving and driven pulleys 11 and 12 and a flexible endless line such as a looped wire 13 passed between the pulleys 11 and 12. The drive motor 10 is mounted on the bottom panel portion of the casing structure 1 and has an output shaft drivingly connected to the driving pulley 11 through suitable power transmission means constituted by a combination of pulleys and endless lines and/or a combination of gears as generally indicated at 14 in FIGS. 1 and 2. The driving and driven pulleys 11 and 12 are located in the vicinity of the side panel portions of the casing structure 1 and have the looped wire 13 passed therebetween. Thus, the looped wire 13 is driven in one direction along its upper straight travelling path between the driving and driven pulleys 11 and 12 and in the other direction along its lower straight travelling path between the pulleys 11 and 12 when the driving pulley 11 is driven by the the output shaft of the motor 10. The looped wire 13 has one of its upper and lower straight traveling portions securely connected to the first carriage member 9 by a connecting member 15 and the other of the straight travelling portions securely connected to the second carriage member 9' by a connecting member 15' (FIG. 1). When the looped wire 13 is driven between the driving and driven pulleys 11 and 12 by means of the drive motor 10, one of the first and second carriage members 9 and 9' is moved toward the driving pulley 11 and the other carriage member is moved toward the driven pulley 12. In the arrangement herein shown, it is assumed by way of example that the looped wire 13 is driven in a direction indicated by arrow heads $d_1$ in FIG. 2 and as a consequence the first and second carriage members 9 and 9' are caused to move away from each other when the motor 10 is actuated to drive its output shaft in a direction indicated by arrow $D_1$ in FIG. 2. When the motor 10 is actuated to drive its output shaft in a direction indicated by arrow $D_2$ in FIG. 2, the looped wire 13 is thus driven in a direction indicated by arrow heads $d_2$ in FIG. 2 and as a consequence the first and second carriage members 9 and 9' are caused to move toward each other. The first and second carriage members 9 and 9' are thus moved toward or away from each other at equal speeds with respect to the casing structure 1 when the drive motor 10 is in operation. The looped wire 13 is preferably constituted in part by a helical tension spring 16 so that the wire 13 as a whole is constantly maintained taut between the driving and driven pulleys 11 and 12.

Figure 6A:
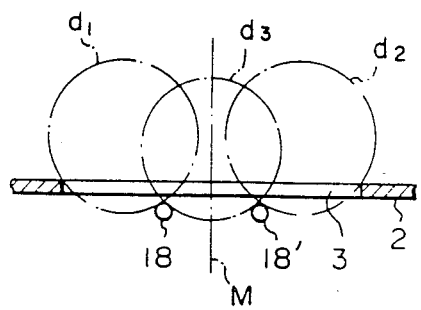
FIGS. 6A and 6B are schematic views showing various positions of a record disc being passed through a slot in a casing structure of the apparatus embodying the present invention.
Figure 6B:
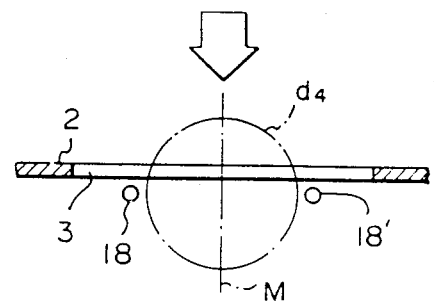

When the drive motor 10 is put into operation driving its output shaft for rotation in the direction of arrow $D_1$ or $D_2$ (FIG. 2), the looped wire 13 is caused to travel in the direction of arrowheads $d_1$ or $d_2$ between the driving and driven pulleys 11 and 12 along the elongated slot 3. It follows that the first and second carriage members 9 and 9' connected to the looped wire 13 are driven to move away from or closer to each other symmetrically with respect to the vertical center plane M (FIG. 1) until the respective disc guide members 18 and 18' on the carriage members 9 and 9' are horizontally spaced a desired distance from each other. If, in this instance, the record disc D being inserted into the casing structure 1 through the slot 3 happens to swerve from the vertical center plane M, viz., from a correct path directed toward a predetermined position within the casing structure 1, the record disc D is brought into abutting contact with one of the first and second disc guide members 18 and 18' and one of the vertical edges of the front panel portion 2 of the casing structure 1 at the extreme ends of the slot 3 as indicated at $d_1$ or $d_2$ in FIG. 6A and is prevented from being further moved into the casing structure 1. If, furthermore, the distance between the first and second disc guide members 18 and 18' moved by the looped wire 13 as above described is less than the diameter of the record disc D being inserted through the slot 3, the record disc D is brought into abutting contact with the disc guide members 18 and 18' as indicated at $d_3$ in FIG. 6A and is also prevented from being further moved into the casing structure 1. If, on the other hand, the record disc D being inserted through the slot 3 is moved along the correct path and the first and second disc guide members 18 and 18' are spaced apart from each other a distance greater than the diameter of the record disc D as indicated at $d_4$ in FIG. 6B, the record disc D is permitted to pass between the disc guide members 18 and 18' toward a predetermined position within the casing structure 1. The above mentioned correct path has a center line perpendicular to the slot 3 and the axis of rotation of the record disc D in the casing structure 1 and contained in the previously mentioned vertical center plane M.

Figure 7A:
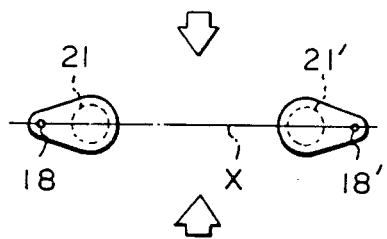
FIGS. 7A and 7B are views showing examples of the arrangement of disc guide elements of the apparatus embodying the present invention.
Figure 7B:
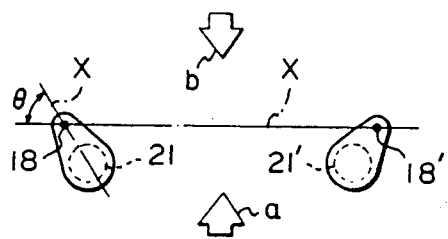

The automatic disc loading apparatus embodying the present invention further comprises detecting means adapted to detect the position of the record disc D being inserted into the casing structure 1 through the slot 3. As will be better seen in FIG. 4, such disc position detecting means comprises support elements 17 and 17' fast on the upper faces of the carriage members 9 and 9', respectively, and first and second disc guide members 18 and 18' upstanding from the support elements 17 and 17', respectively. Each of the disc guide members 18 and 18' is in the form of a rod having a circular cross section and axially extends through and normally to the plane on which the record disc D is to be conveyed into the casing structure 1. Arms 19 and 19' are cantilevered to upper end portions of these disc guide members 18 and 18' and are thus located above the support elements 17 and 17', respectively. The disc position detecting means further comprises first and second light emitter elements 20 and 20' securely mounted on the support elements 17 and 17' and directed upwardly toward the arms 19 and 19', respectively, and first and second light-sensitive transducer elements 21 and 21' securely attached to the lower faces of the arms 19 and 19' and vertically aligned with the first and second light emitter elements 20 and 20', respectively, as will be better seen in FIG. 5. More specifically, the light-sensitive transducer elements 21 and 21' are spaced apart from the light emitter elements 20 and 20' across the plane on which the record disc D is to be passed into the casing structure 1 through the slot 3. Each of the light-sensitive transducer elements 21 and 21' is thus capable of detecting the presence of the record disc D being moved between the light emitter and transducer elements 20 and 21 and between the light emitter and transducer elements 20' and 21'. In this instance, it is important that the light emitter elements 20 and 20' and light-sensitive transducer elements 21 and 21' be located so that each of the transducer elements 21 and 21 has the center point of its sensitive area situated on a line X joining the center axes of the disc guide members 18 and 18', as indicated in FIG. 7A. With such arrangment of the light emitter elements 20 and 20' and light-sensitive transducer elements 21 and 21', the transducer elements 21 and 21' are enabled to detect the presence of the record disc D being moved between the light emitter and transducer elements 20 and 21 and between the light emitter and transducer elements 20' and 21'. If the light-sensitive transducer elements 21 and 21' are located so that the center point of the sensitive area of each transducer element is situated on a line X' inclined at a certain angle $\theta$ to the line X between the center axes of the disc guide members 18 and 18' as indicated in FIG. 7B, the transducer elements 21 and 21 are capable of detecting the passage of the record disc D when the record disc D is being moved in one direction (denoted by a in FIG. 7B). When, the record disc D is being moved in the opposite direction (denoted by b in FIG. 7B), the record disc D is brought into contact with the disc guide members 18 and 18' before the record disc D reaches a position to be detected by the transducer elements 21 and 21' and, for this reason, the passage of the record disc D can not be detected reliably by the transducer elements 21 and 21'.

Figure 8:
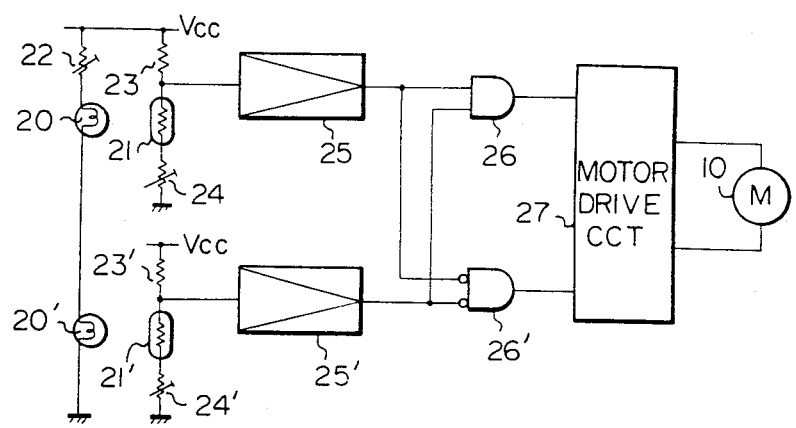
FIG. 8 is a diagram showing a preferred example of a motor drive circuit for the disc guide means of the apparatus embodying the present invention.

The drive motor 10 to drive first and second carriage members 9 and 9' as above described is controlled by an electric control circuit shown in FIG. 8. The control circuit is provided in combination with the above described light emitter elements 20 and 20' and light-sensitive transducer elements 21 and 21'. The light emitter elements 20 and 20' are connected in series between a constant-voltage power source $V_{cc}$ and ground through a current-limiting semi-adjustable resistor 22. On the other hand, the first light-sensitive transducer element 21 is connected between the power source $V_{cc}$ and ground through a series combination of a resistor 23 and a semi-adjustable resistor 24 and, likewise, the second light-sensitive transducer element 21' is connected between the power source $V_{cc}$ and ground through a series combination of a resistor 23' and a semi-adjustable resistor 24'. Each of the light-sensitive transducer elements 21 and 21' is constituted by, for example, a CdS photoconductor to exhibit a resistance variable with the quantity of the light incident thereon. Each of the semi-adjustable resistors 24 and 24' is adjusted so that the sum of the resistance of the particular resistor and the variable resistance of each of the light-sensitive transducer elements 21 and 21' is equal to the resistance of each of the resistors 23 and 23' when the beam of light emanating from each of the light emitter elements 20 and 20' toward the associated light-sensitive transducer element is intercepted by the record disc D by approximately 50 percent of the cross sectional area of the beam.

Figure 9:
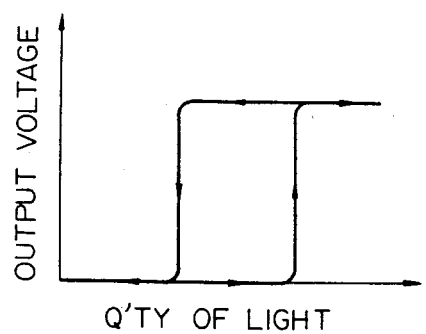
FIG. 9 is a graph showing an example of the performance characteristic of amplifiers forming part of the circuit shown in FIG. 8.

The node between the first light-sensitive transducer element 21 and the associated resistor 23 and the node between the second light-sensitive transducer element 21' and the associated resistor 23' constitute output terminals of the transducer elements 21 and 21, respectively, so that potentials varying with the movement of the record disc D with respect to the disc guide members 18 and 18' appear at these terminals. These output terminals of the light-sensitive transducer elements 21 and 21' are connected to first and second amplifiers 25 and 25', respectively, each of which is adapted to exhibit a hysteresis characteristic between the quantity of light incident on each of the transducer elements 21 and 21' and the voltage output from the transducer as shown in FIG. 9. Each of the amplifiers 25 and 25' is thus operative to produce a logic "0" output signal in response to a quantity of light smaller than a first predetermined value $q_1$ and a logic "1" output signal in response to a quantity of light larger than the first predetermined value $q_1$ when the quantity of light is on the decrease and to produce a logic "0" output signal in response to a quantity of light smaller than a second predetermined value $q_2$ larger than the first predetermined value $q_1$ and a logic "1" output signal in response to a quantity of light larger than the second predetermined value $q_2$ when the quantity of light is on the increase. The first amplifier 25 has its output terminal connected to one of the input terminals of each of first and second logic "AND" gate circuits 26 and 26' and the second amplifier 25' has its output terminal connected to the other input terminal of each of the first and second logic "AND" gate circuits 26 and 26' The logic "0" and/or "1" output signals produced by the first and second amplifiers 25 and 25' are thus fed to each of the first and second logic "AND" gate circuits 26 and 26'. The first logic "AND" gate circuit 26 is of the positive logic type and is thus adapted to produce a logic "1" output signal in response to logic "1" signals appearing at both of its input terminals, while the second logic "AND" gate circuit 26' is of the negative logic type and is adapted to produce a logic "1" output signal in response to logic "0" output signals appearing at both of its input terminals. The logic "AND" gate circuits 26 and 26' have their respective output terminals connected to a motor drive circuit 27 having an output terminal connected to the coil of the drive motor 10, which is thus operative to drive its output shaft in either direction in response to a logic "1" output signal from one of the first and second logic "AND" gate circuits 26 and 26'. In the embodiment herein shown, it is assumed by way of example that the motor drive circuit 27 is arranged so that the motor 10 is operative to drive its output shaft in a direction to cause the disc guide members 18 and 18' to move closer to each other in response to a logic "1" output signal from the first logic "AND" gate circuit 26 and in a direction to cause the disc guide members 18 and 18' to move away from each other in response to a logic "1" output signal from the second logic "AND" gate circuit 26'. In the absence of a logic "1" signal, the motor drive circuit 27 holds the motor 10 at rest.

Figure 4:
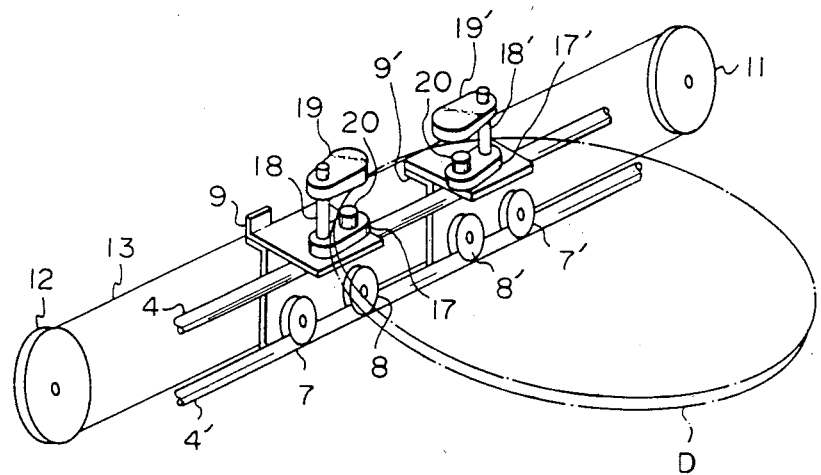
FIG. 4 is a perspective view showing disc guide means forming part of the apparatus embodying the present invention.
Figure 5:
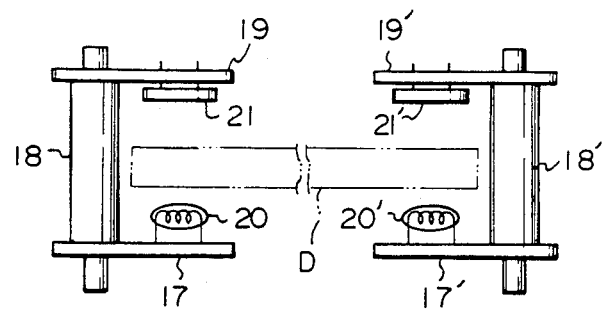
FIG. 5 is a schematic front end view showing the arrangement of disc detecting means forming part of the apparatus embodying the present invention.

When, now, the record disc D is inserted along a correct path into the casing structure 1 through the slot 3 as indicated by dots-and-dash lines in FIG. 4, a leading arcuate portion of the record disc D enters the area between the first light emitter element 20 and first light-sensitive transducer element 21 and the area between the second light emitter element 20' and second light-sensitive transducer element 21'. The beams of light emanating from the first and second light emitter elements 20 and 20' toward the first and second light-sensitive transducer elements 21 and 21', respectively, are therefore intercepted by the leading arcuate portion of the record disc D so that the quantity of light incident on each of the transducer elements 21 and 21' decreases gradually. When the quantity of light incident on each of the light-sensitive transducer elements 21 and 21' is reduced below a predetermined value, viz., the above mentioned first predetermined value $q_1$ (FIG. 9), a logic "0" output signal is produced at the output terminal of each of the first and second amplifiers 25 and 25'. In response to the logic "0" signals thus appearing at the output terminals of the first and second amplifiers 25 and 25', the first logic "AND" gate circuit 26 of the positive logic type produces a logic "0" output signal and, concurrently, the second logic "AND" gate circuit 26' of the negative logic type delivers a logic "1" output signal to the motor drive circuit 27, actuating the motor 10 to drive its output shaft in, for example, the direction of arrow $D_1$ (FIG. 2). It therefore follows that the looped wire 13 is driven in the direction of arrow-heads $d_1$ and as a consequence the first and second carriage members 9 and 9' and accordingly the first and second light-sensitive transducer elements 21 and 21' are caused to move away from each other. Such movement of the light-sensitive transducer elements 21 and 21' gives rise to an increase in the quantity of light incident on each of the transducer elements 21 and 21'. When the quantity of light incident on one of the transducer elements 21 and 21' reaches the above mentioned second predetermined value $q_2$ (FIG. 9), the logic "0" signal which has been present at the output terminal of the amplifier 25 or 25' (FIG. 8) connected to the particular transducer element is shifted to a logic "1" signal. In the presence of the logic "1" signal thus appearing at the output terminal of one of the first and second amplifiers 25 and 25' and the logic "0" signal at the output terminal of the other of the amplifiers 25 and 25', the first logic "AND" gate circuit 26 of the positive logic type delivers a logic "1" output signal and the second logic "AND" gate circuit 26' delivers a logic "0" output signal to the motor drive circuit 27, thus causing the motor 10 to stop. When the record disc D is further moved into the casing structure 1 through the slot 3, the beams of light emitted from the light emitter elements 20 and 20' are partially intercepted by the record disc D so that a logic "1" signal is for a second time delivered from the second logic "AND" gate circuit 26 to the motor drive circuit 27, actuating the motor 10 to drive the carriage members 9 and 9' away from each other. By repetition of these steps, the carriage members 9 and 9' are gradually moved into the casing structure 1 through the slot 3. When the record disc D is completely admitted into the casing structure 1 past the beams of light from the light emitter elements 20 and 20', the beams of light are permitted to totally reach the light-sensitive transducer elements 21 and 21' so that the quantity of light incident on each of the light-sensitive transducer elements 21 and 21' becomes maximal and causes the first and second amplifiers 25 and 25' to produce logic "1" output signals. In response to the logic "1" signals thus appearing at the output terminals of the amplifiers 25 and 25', the first logic "AND" gate circuit 26 of the positive logic type delivers a logic "1" output signal to the motor drive circuit 27 and actuates the motor 10 to drive its output shaft in the direction of arrow $D_2$ (FIG. 2). It therefore follows that the looped wire 13 is driven in the direction of arrowheads $d_2$ and as a consequence the first and second carriage members 9 and 9' and accordingly the first and second light-sensitive transducer elements 21 and 21' are caused to move closer to each other.

The following table shows the modes of operation of the motor drive circuit shown in FIG. 8 when the record disc D is inserted into the casing structure 1 (1) along a correct path toward a predetermined position in the casing structure 1, (2) along a leftwardly deviated path, or (3) along a rightwardly deviated path, or (4) when there is no record disc D being moved into or out of the casing structure 1.

|  | Path of Disc | | | |
|---|---|---|---|---|
|  | Correct | Deviated leftward | Deviated rightward | No disc present |
| Light incident on | | | | |
| Element 21 | None | Max. | None | Max. |
| Element 21' | None | None | Max. | Max. |
| Signal from | | | | |
| Amp. 25 | "0" | "1" | "0" | "1" |
| Amp. 25' | "0" | "0" | "1" | "1" |
| Signal from | | | | |
| Gate 26 | "0" | "0" | "0" | "1" |
| Gate 26' | "1" | "0" | "0" | "0" |
| Carriages 9 and 9' | Moved apart | Rest | Rest | Moved together |

As will be seen from the above table, there are no beams of light incident on the light-sensitive transducer elements 21 and 21' and accordingly both of the first and second amplifiers 25 and 25' produce logic "0" output signals when the record disc D is being inserted along a correct path into the the casing structure 1. In this instance, the first logic "AND" gate circuit 26 produces a logic "0" output signal and the second logic "AND" gate circuit 26' produces a logic "1" output signal so that the carriage members 9 and 9' are driven apart from each other. When the path of the record disc D being inserted into the casing structure 1 is deviated leftwardly from the correct path, the quantity of light incident on the first light-sensitive transducer element 21 becomes maximal and there is no beam of light incident on the second light-sensitive transducer element 21' so that the first amplifier 25 produces a logic "1" output signal and the second amplifier 21' produces a logic "0" output signal. In this instance, both of the first and second logic "AND" gate circuits 26 and 26' produce logic "0" output signals and, as a consequence, the carriage members 9 and 9' are held at rest on the guide rods 4 and 4' (FIGS. 2 and 3). When, on the other hand, the path of the record disc D being inserted into the casing structure 1 is deviated rightwardly from the correct path, there is no beam of light incident on the first light-sensitive transducer element 21 and the beam of light incident on the second light-sensitive transducer element 21' becomes maximal so that the first amplifier 25 produces a logic "0" output signal and the second amplifier 21' produces a logic "1" output signal. In this instance, both of the first and second logic "AND" gate circuits 26 and 26' produce logic "0" output signals and, as a consequence, the carriage members 9 and 9' are also held at rest on the guide rods 4 and 4' (FIGS. 2 and 3). In the absence of a disc being inserted into the casing structure 1, the quantities of light incident on the light-sensitive transducer elements 21 and 21' become maximal and accordingly both of the first and second amplifiers 25 and 25' produce logic "1" output signals. In this instance, the first logic "AND" gate circuit 26 produces a logic "1" output signal and the second logic "AND" gate circuit 26' produces a logic "0" output signal so that the carriage members 9 and 9' are driven toward each other.

Figure 10:
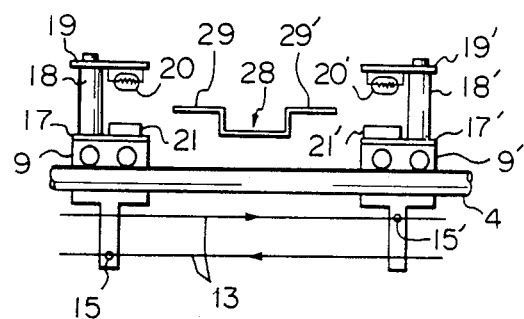
FIG. 10 is a schematic front end view showing the arrangement of home position determining means forming part of the apparatus embodying the present invention.

Turning to FIG. 10 of the drawings, the automatic disc loading apparatus embodying the present invention further comprises home position determining means adapted to determine predetermined home positions of the first and second carriage members 9 and 9' with respect to the casing structure 1. In FIG. 10, such home position determining means is shown comprising a shield plate 28 positioned behind the slot 3 and having opposite side end portions 29 and 29' located on a plane intervening between each of the light emitter elements 20 and 20' and each of the light-sensitive transducer elements 21 and 21'. The shield plate 28 is positioned with respect to the casing structure 1 so that these opposite end portions 29 and 29' thereof are further located in such a manner as to intercept the beams of light emanating from the light emitter elements 20 and 20' toward the light-sensitive transducer elements 21 and 21', respectively, when the first and second carriage members 9 and 9' are spaced apart a predetermined minimum distance from each other. When the carriage members 9 and 9' are driven toward each other in the absence of the record disc D above the light-sensitive transducer elements 21 and 21' and reach positions spaced apart such a distance from each other, the beam of light from one of the first and second light emitter elements 20 and 20' is intercepted first by one of the end portions 29 and 29' of the shield plate 28. It follows that one of the first and second amplifiers 25 and 25' (FIG. 8) produces a logic "0" output signal and the other of the amplifiers 25 and 25' produces a logic "1" output signal so that both of the first and second logic "AND" gate circuits 26 and 26' produce logic "0" output signals as will be understood from the above table. The motor 10 is thus brought to a stop and, as a consequence, the first and second carriage members 9 and 9' are held at the positions spaced apart the above mentioned predetermined minimum distance from each other behind the slot 3. The particular positions are the respective home positions of the carriage members 9 and 9'. The distance between the carriage members 9 and 9 in such home positions is selected so that the distance between the disc guide members 18 and 18' on the carriage members in the home positions is less than the diameter of minimum sized record discs to be put to use on the disc player equipped with the loading apparatus embodying the present invention. In this instance, it is important that the minimum distance between the carriage members be further selected so that each end of the slot 3 and the distance between each of the disc guide members 18 and 18' on the carriage members 9 and 9 in the home positions is also smaller than the diameter of such record discs. In the description to follow, it will be assumed that the record disc D is of any of an n number of different standardized sizes.

Figure 11:
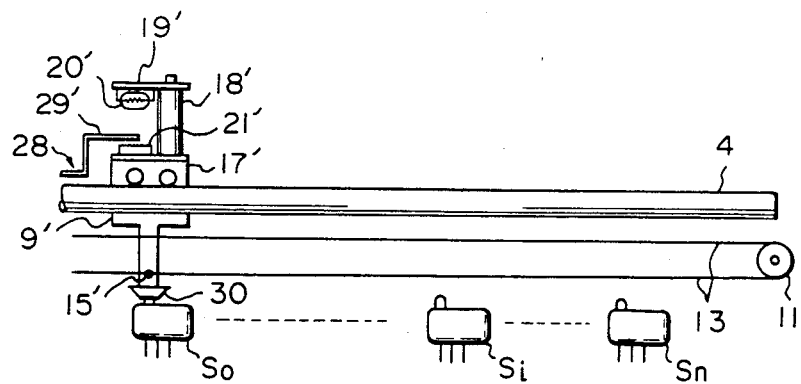
FIG. 11 is a schematic front end view showing the arrangement of position detecting means forming part of the apparatus embodying the present invention.

The automatic disc loading apparatus embodying the present invention further comprises position detecting means adapted to detect the position of one of and accordingly the respective positions of both of the carriage members 9 and 9' or the respective positions of the disc guide members 18 and 18' with respect to the casing structure 1. In FIG. 11 of the drawings, such detecting means is shown comprising a plurality of switch units $S_0, S_1, \ldots S_n$ which are arranged at regular intervals along the path of one of the first and second carriage members such as the second carriage member 9' as shown. The switch units $S_1, S_2, \ldots S_n$, viz., the switch units except for the switch unit $S_0$ are respectively allocated to record discs of the above mentioned n number of standardized sizes. The carriage member 9' has a lug portion constituting switch actuating element 30 protruding toward the array of the switch units $S_0, S_1, S_2, \ldots S_n$ and selectively engageable with the switch unit $S_0, S_1, \ldots S_n$. Each of these switch units $S_0, S_1, S_2, \ldots S_n$ has two states and is adapted to shift between these two states when the carriage members 9 and 9' spaced apart from each other a distance to allow a record disc of a first predetermined or standardized diameter are driven closer to or away from each other to positions spaced apart from each other a distance to allow a record disc of a second predetermined or standardized diameter. When the carriage members 9 and 9' are spaced apart such a predetermined minimum distance from each other in the absence of a record disc therebetween, the switch actuating element 30 on the carriage member 9' is held in engagement with the first switch unit $S_0$ as shown and maintains the switch unit $S_0$ in one of the two states thereof. Each of the switches $S_0, S_1, S_2, \ldots S_n$ has two stationary contact elements and one movable contact element movable between these stationary contact elements, as will be described in more detail.

Turning back to FIGS. 1 to 3 of the drawings, the automatic disc loading apparatus embodying the present invention further comprises disc transfer means adapted to transfer the the record disc D to a predetermined position within the casing structure 1 after the disc has been inserted into the casing structure 1 through the slot 3. Such disc transfer means comprises a horizontal carrier plate 31 provided within the casing structure 1 and having securely attached thereto a pair of front guide members 32 and 32' spaced apart in parallel from each other laterally of the casing structure 1 and a pair of rear guide members 33 and 33' also spaced apart laterally of the casing structure 1 and further from the front guide members 32 and 32' in fore-and-aft directions of the casing structure 1. The front guide members 32 and 32' and the rear guide members 33 and 33' are slidably received on a pair of guide rails 34 and 34' securely connected to the casing structure 1 and longitudinally extending in fore-and-aft directions of the casing structure 1 from behind the front panel portion 2 toward the rear panel portion of the casing structure 1. The carrier plate 31 is thus movable in a fore-and-aft direction of the casing structure 1 between a predetermined first or foremost position closest to the front panel portion 2 of the casing structure 1 as indicated by full lines and a predetermined second or rearmost position remotest from the panel portion 2 as indicated by dots-and-dash lines in FIG. 1. The carrier plate 31 has formed in its front central portion a generally U-shaped slot 35 which is open toward the front panel portion 2 of the casing structure 1 as shown in FIG. 1. When the carrier plate 31 is moved to the predetermined rearmost position thereof, the U-shaped slot 35 is located to contain the axis of rotation of the record disc D to be played back, as will be seen from FIG. 1. The carrier plate 31 has securely attached to the underside thereof a rotation preventive plate 36 which is elongated in parallel with the guide rails 34 and 34' and which has a recess 37 formed in the inner side edge portion thereof. The particular side edge portion of the rotation preventive plate 36 is engaged by a stop pin 38 secured to one end portion of a control lever 39 which is positioned above a horizontal slide plate 40 having a front end portion positioned below and in parallel with the carrier plate 31. The slide plate 40 is formed with front and rear guide grooves 41 and 42 which are elongated in parallel with the guide rails 34 and 34' and which are arranged in series with each other in a fore-and-aft direction of the casing structure 1. Front and rear guide rods 43 and 44 extend vertically through these guide grooves 41 and 42, respectively, and are securely connected to the bottom panel portion of the casing structure 1. The slide plate 40 is further formed with a generally L-shaped key groove 45 elongated in parallel with the rear guide groove 42 and having at its foremost end a cam-forming portion 45a which is bent laterally of the casing structure 1. The control lever 39 is pivotally mounted on the rear guide rod 44 and is urged, by suitable biasing means, to turn counter-clockwise in FIG. 1, viz., in a direction to have the stop pin 38 moved away from the inner side edge of the rotation preventive plate 36 about the center axis of the guide rod 44 with respect to the carrier plate 31 and the slider plate 40. In the arrangement shown in FIG. 1, such biasing means comprises a preloaded helical tension spring 46 which is anchored at one end thereof to the control lever 39 and at the other end thereof to the casing structure 1. The control lever 39 has fixedly attached thereto a cam follower element 47 which is received in the key groove 45. The stop pin 38 on the control lever 39 is engaged by the inner side edge of the rotation preventive plate 36 and is received in the recess 37 in the rotation preventive plate 36 when the carrier plate 31 is moved rearwardly from the predetermined foremost position thereof to the predetermined rearmost position thereof with respect to the slider plate 40 as will be understood more clearly as the description proceeds. The location of the recess 37 in the rotation preventive plate 36 is such that the recess 37 is located on the arcuate path of the stop pin 38 about the center axis of the rear guide pin 44 when the carrier plate 31 is moved to the predetermined rearmost position thereof. The carrier plate 31 is driven between these predetermined foremost and rearmost positions by drive means comprising a rack member 48 integral with or securely connected to the slider plate 40 and elongated in parallel with the guide rails 34 and 34'. The rack member 48 is engaged by a pinion gear 49 rotatable about an axis fixed with respect to the carrier plate 31. The pinion gear 49 is driven for rotation from a reversible motor 50 through suitable power transmission means 51 constituted by a combination of pulleys and endless lines and/or a combination of gears mounted on the carrier plate 31 as seen in FIGS. 1 and 2.

The automatic disc loading apparatus embodying the present invention further comprises disc stop means adapted to stop the movement of the record disc D in a predetermined position with respect to the casing structure 1 depending upon the size of the disc when the record disc D is inserted into the casing structure 1 through the slot 3. Referring to FIG. 12, such disc stop means comprises plural pairs of apertures $H_1$, $H'_1$; $H_2$, $H'_2$; ... $H_n$, $H'_n$ formed in the carrier plate 31 and plural pairs of disc stop elements $P_1$, $P'_1$; $P_2$, $P'_2$; ... $P_n$, $P'_n$ which are axially movable vertically through the apertures $H_1$, $H'_1$; $H_2$, $H'_2$; ... $H_n$, $H'_n$, respectively, in the carrier plate 31. The apertures $H_1$, $H'_1$; $H_2$, $H'_2$; ... $H_n$, $H'_n$ in the carrier plate 31 are arranged so that each pair of apertures are located at a predetermined distance from a vertical axis O located on the previously mentioned vertical center plane M and that the distance between the axis O and each pair of apertures is equal to one of the radii of record discs of the previously mentioned n number of standardized sizes. In the arrangement shown in FIG. 12, the locations of the apertures $H_1$, $H'_1$; $H_2$, $H'_2$; ... $H_n$, $H'_n$ are thus assumed to respectively correspond to the n number of standardized sizes of record discs. The distance between the axis O and, for example, the pair of apertures $H_1$ and $H'_1$ is therefore assumed to be equal to the radius of record discs of a standardized minimum size and the distance between the axis O and the pair of apertures $P_n$ and $P'_n$ is assumed to be equal to the radius of record discs of a standardized maximum size.

The pairs of disc stop elements $P_1$, $P'_1$; $P_2$, $P'_2$; ... $P_n$, $P'_n$ are selectively driven to protrude upwardly above or retract downwardly below the upper face of the carrier plate 31 through the apertures $H_1$, $H'_1$; $H_2$, $H'_2$; ... $H_n$, $H'_n$, respectively, by drive means shown in FIG. 13. The drive means shown in FIG. 13 is associated with the pair of disc stop elements $P_1$ and $P'_1$ and comprises, as also shown in FIG. 1, a pair of bell-crank levers 52 and 52' each having an intermediate fulcrum portion pivotally connected to a bracket member secured to the lower face of the carrier plate 31 and one arm portion pivotally connected to each of the disc stop elements $P_1$ and $P'_1$, and the other arm portion pivotally connected to the plunger of a solenoid-operated actuator unit 53. The drive means for the remaining disc stop elements $P_2$, $P'_2$; ... $P_n$, $P'_n$ are constructed and arranged similarly to such drive means for the disc stop elements $P_1$ and $P'_1$. The solenoid-operated actuator unit 53 is assumed, by way of example, as being such that the plunger thereof protrudes from the actuator housing when the actuator unit 53 is kept deenergized and is driven to retract when the actuator unit 53 is energized. When the actuator unit 53 is energized and as a consequence the disc stop elements $P_1$ and $P'_1$ are driven to protrude upwardly above the upper face of the carrier plate 31, the record disc D is brought into abutting engagement at its leading arcuate edge with the disc stop elements $P_1$ and $P'_1$ if the particular record disc D is of the radius of record discs of the above mentioned standardized minimum size. When, on the other hand, the actuator unit (not shown) associated with the disc stop elements $P_n$ and $P'_n$ is energized and the disc stop elements $P_1$ and $P'_1$ are driven to protrude upwardly above the upper face of the carrier plate 31, the record disc D is brought into abutting engagement at its leading arcuate edge with the disc stop elements $P_n$ and $P'_n$ if the record disc D is of the radius of record discs of the above mentioned standardized maximum size.

The record disc D thus brought into abutting engagement with any pair of $P_1$, $P'_1$; $P_2$, $P'_2$; ... $P_n$, $P'_n$ is detected by disc position detecting means comprising a plurality of light emitter elements mounted on the lower face of the upper panel portion of the casing structure 1 as represented by disc stop pin E in FIG. 13 and a plurality of light-sensitive transducer elements $T_1$, $T_2$, ... $T_n$ mounted on the carrier plate 31 as shown in FIG. 12. The light emitter elements E are located, from the above mentioned vertical axis X, at distances respectively equal to the distances at which the pairs of apertures $H_1$, $H'_1$; $H_2$, $H'_2$; ... $H_n$, $H'_n$ are located from the axis X. The light-sensitive transducer elements $T_1$, $T_2$, ... $T_n$ are located in alignment with the light emitters E, respectively. Each of the light emitter elements E may be constituted by a light emissive diode and each of the light-sensitive transducer elements $T_1$, $T_2$, ... $T_n$ may be constituted by a phototransistor.

Figure 14:
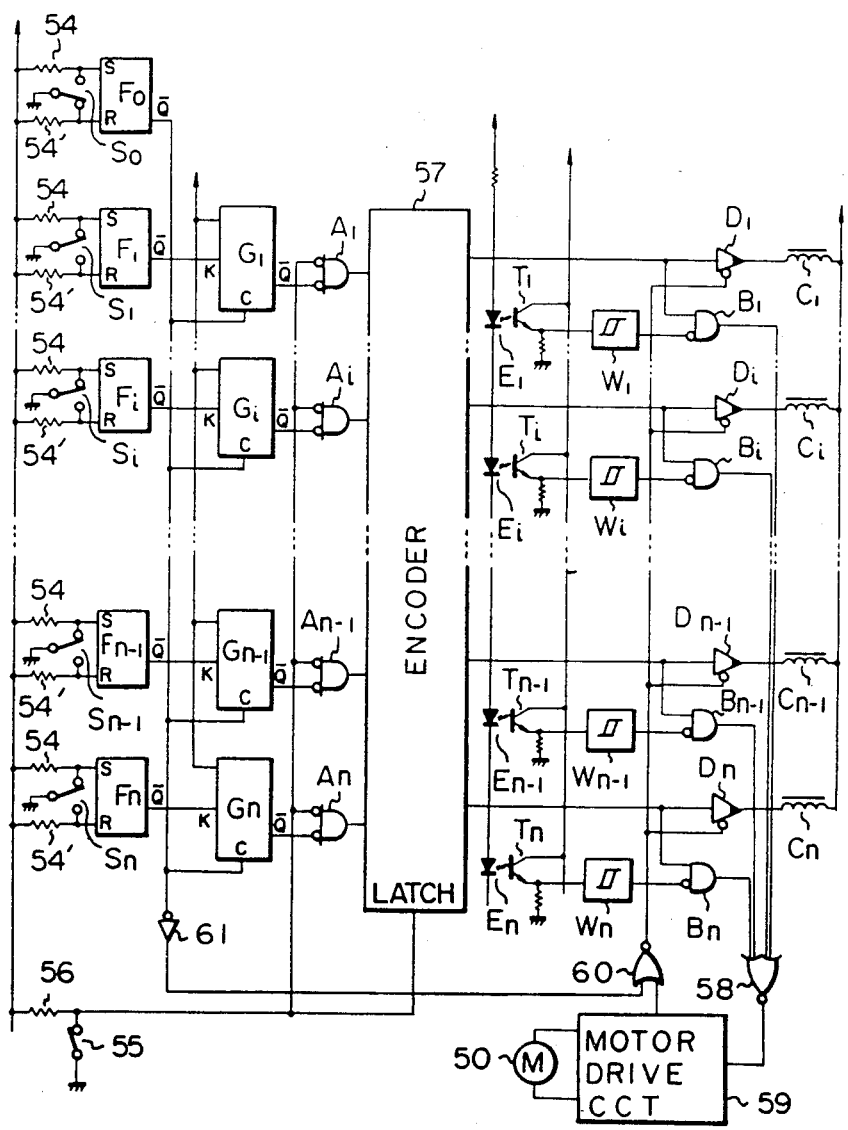
FIG. 14 is a diagram showing a preferred example of a control circuit for the drive means shown in FIG. 13.

The solenoid-operated actuator units such as the actuator unit 53 for the disc stop elements $P_1$ and $P'_1$ are energized and de-energized under the control of a control circuit shown in FIG. 14. Referring to FIG. 14, the control circuit is supplied with signals from the above described switch units $S_0$, $S_1$, $S_2$, ... $S_n$ (FIG. 11) and light-sensitive transuducer elements $T_1$, $T_2$, ... $T_n$ (FIGS. 12 and 13). The light emitter elements respectively associated with these transducer elements $T_1$, $T_2$, ... $T_n$ are denoted by $E_1$, $E_2$, ... $E_n$, respectively, and are respectively allocated to the n number of standardized sizes of record discs. Each of the switch units $S_0$, $S_1$, $S_2$, ... $S_n$ has two stationary contact elements electrically connected to a constant-voltage power source $V_{cc}$ through resistors 54 and 54' and one movable contact element movable between these stationary contact elements and connected to ground. The stationary contact elements of the individual switch units $S_0$, $S_1$, $S_2$, ... $S_n$ are further connected to set and reset terminals S and R of set-reset flip-flop circuits $F_0$, $F_1$, $F_2$, ... $F_n$, respectively, each having an inverted output terminal $\overline{Q}$. The set and reset terminals S and R of each of these flip-flop circuits $F_0$, $F_1$, $F_2$, ... $F_n$ are thus connected through the resistors 54 and 54', respectively, to the constant-voltage power source $V_{cc}$. Thus, each of the switch units $S_0$, $S_1$, $S_2$, ... $S_n$ has a first state having its movable contact element held in contact with one of the stationary contact elements of the switch unit and accordingly establishing connection between the set terminal S and the power source $V_{cc}$ and between the reset terminal R and ground and a second state having its movable contact element held in contact with the other of the stationary contact elements of the switch unit and accordingly establishing connection between the set terminal S and ground and between the reset terminal and the power source $V_{cc}$. Each of the switch units $S_0$, $S_1$, $S_2$, ... $S_n$ is urged to stay in the first state thereof and is caused to shift from the first to the second state thereof when the switch actuating element 30 on the carriage member 9' (FIG. 11) is held in contact with the particular switch unit. The switch unit $S_0$ located at the innermost end of the array of the switch units $S_0$, $S_1$, $S_2$, ... $S_n$ as shown in FIG. 11 thus remains in the second state thereof in the absence of a record disc between the carriage members 9 and 9' (FIGS. 1 to 3). The inverted output terminal $\overline{Q}$ of the flip-flop circuit $F_0$ is connected to the clear terminals C of trigger flip-flop circuits $G_1$, $G_2$, ... $G_n$, and the inverted output terminal $\overline{Q}$ of the set-reset flip-flop circuits $F_1$, $F_2$, ... $F_n$ are connected to the clock input terminals K of the trigger flip-flop circuits $G_1$, $G_2$, ... $G_n$, respectively. The trigger flip-flop circuits $G_1$, $G_2$, ... $G_n$ have inverted output terminal $\overline{Q}$ connected to logic "AND" gate circuits $A_a$, $A_2$, ... $A_n$, respectively, each of the negative logic type. Each of these logic "AND" gate circuits $A_1$, $A_2$, ... $A_n$ has one input terminal thus connected to the inverted output terminal $\overline{Q}$ of each of the trigger flip-flop circuits $G_1$, $G_2$, ... $G_n$, respectively, and the other input terminal grounded across a carrier position responsive switch 55 and connected to the constant-voltage power source $V_{cc}$ through a resistor 56. The carrier position responsive switch 55 is provided in conjunction with the carrier plate 31 (FIGS. 1 and 12) or, more particularly, with one of the guide members 37 and 37' or 38 and 38' (FIG. 1) and is adapted to close when the carrier plate 31 stays in the previously mentioned predetermined foremost position thereof as will be described in more detail. Each of the logic "AND" gate circuits $A_1$, $A_2$, ... $A_n$ is thus operative to produce a logic "1" output signal on its output terminal when, and only when, logic "0" signals are present at the output terminal of its associated trigger flip-flop circuits $G_1$, $G_2$, ... $G_n$. The respective output terminals of the logic "AND" gate circuits $A_1$, $A_2$, ... $A_n$ are connected to input terminals of disc size discriminating means constituted by an encoder 57, which has a latch terminal grounded across the above mentioned carrier position responsive switch 55 and connected to the constant-voltage power source $V_{cc}$ through the resistor 56. The encoder 57 is operative to calculate the size of the record disc D being inserted into the casing structure 1 (FIGS. 1 to 3) on the basis of the signals appearing at the respective output terminals of the logic "AND" gate circuits $A_1$, $A_2$, ... $A_n$ and to produce a logic "1" signal at any of its output terminals $Y_1$, $Y_2$, ... $Y_n$.

The control circuit shown in FIG. 14 further comprises logic "AND" gate circuits $B_1$, $B_2$, ... $B_n$ each having a positive-logic input terminal (indicated by a plain line) and a negative-logic input terminal (indicated by a line with a spot "o"). The output terminals $Y_1$, $Y_2$, ... $Y_n$ of the encoder 57 are connected on one hand to the positive-logic input terminals on these logic "AND" gate circuits $B_1$, $B_2$, ... $B_n$, respectively, and on the other hand to driver circuits $D_1$, $D_2$, ... $D_n$, respectively, each having a control terminal. The output terminals of these driver circuits $D_1$, $D_2$, ... $D_n$ are connected to the constant-voltage power source $V_{cc}$ through the coils $C_1, C_2, \ldots C_n$ of the previously described solenoid-operated actuators for 53 for the disc stop elements $P_1, P_2, \ldots P_n$, respectively. The light-sensitive transducer elements $T_1, T_2, \ldots T_n$ previously described with reference to FIGS. 12 and 13 are respectively constituted by phototransistors having their respective collectors connected to the constant-voltage power source $V_{cc}$ and their respective emitters connected to wave shaping circuits $W_1, W_2, \ldots W_n$ which have their output terminals connected to the negative-logic input terminals of the logic "AND" gate circuits $B_1, B_2, \ldots B_n$, respectively. The logic "AND" gate circuits $B_1, B_2, \ldots B_n$ have their output terminals connected to input terminals of a first logic "NOR" gate circuit 58 which has its output terminal connected to an input terminal of a motor drive circuit 59. The motor drive circuit 59 in turn has a signal output terminal connected to one input terminal of a second logic "NOR" gate circuit 50, which has the other input terminal connected to through a logic inverter 61 to the inverted output terminal $\overline{Q}$ of the set-reset flip-flop circuit $F_0$. The second logic "NOR" gate circuit 60 has its output terminal connected to the respective control terminals of the driver circuits $D_1, D_2, \ldots D_n$ as shown. The motor control circuit 59 is adapted to control the motor 50 for driving the carrier plate 31 for movement with respect to the slider plate 40 (FIGS. 1 to 3).

Description will be made regarding the operation of the above described control circuit on the assumption that the record disc D being inserted into the casing structure 1 is of the ith size out of the n number of standardized different sizes. Before the record disc D is inserted into the casing structure 1 and accordingly in the absence of a record disc between the carriage members 9 and 9′, the innermost switch unit $S_0$ is maintained in the second state connecting the set terminal S of the flip-flop circuit $F_0$ to the power source $V_{cc}$ with the reset terminal R of the circuit $F_0$ grounded as shown in FIG. 14. Each of the other set-reset flip-flop circuits $F_1, F_2, \ldots F_n$ in maintained in the first state connecting the reset terminal R of the associated flip-flop circuit to the power source $V_{cc}$ with the set terminal S of the flip-flop circuit grounded as also shown in FIG. 14. A logic "1" signal is thus present at the inverted output terminal $\overline{Q}$ of the set-reset flip-flop circuit $F_0$ and accordingly at the respective clear terminals C of the trigger flip-flop circuits $G_1, G_2, \ldots G_n$, which are thus maintained in cleared states. As the record disc D of such a size is inserted deeper into the casing structure 1 through the slot 3 (FIG. 1), the carriage members 9 and 9′ are driven to move away from each other by means of the disc guide members 18 and 18′ and under the control of the control circuit shown in FIG. 8. The switch unit $S_0$ is therefore caused to shift from the second state to the first state thereof and thereupon the subsequent switch units $S_1, S_2, \ldots$ are successively caused to shift from the first states to the second states and thereafter back from the second states to the first states thereof until the switch unit Si is shifted to the second state thereof. When the switch unit $S_0$ is caused to shift from the second state to the first state, the set-reset flip-flop circuit $F_0$ produces a logic "0" signal at its inverted ouput terminal $\overline{Q}$ and permits the flip-flop circuits $G_1, G_2, \ldots G_n$ to be triggered by the logic "1" output signals delivered from the respectively associated set-reset flip-flop circuits $F_1, F_2, \ldots F_n$ when the flip-flop circuits $F_1, F_2, \ldots$ are set in succession. The logic "1" signals which have been present at the inverted output terminal $\overline{Q}$ of the trigger flip-flop circuits $G_1, G_2, \ldots$ are thus successively shifted to logic "0" signals.

When the record D is being inserted into the casing structure 1, the carrier plate 31 is held in the predetermined foremost position thereof with respect to the casing structure 1 so that the carrier position responsive switch 55 is closed and as a consequence logic "0" signals are present at the latch terminal of the encoder 57 and one of the input terminals of each of the logic "AND" gate circuits $A_1, A_2, \ldots A_n$. The logic "0" output signals produced in succession by the trigger flip-flop circuits $G_1, G_2, \ldots$ as above described are passed through the logic "AND" gate circuits $A_1, A_2, \ldots$ to the encoder 57 which is maintained in an unlatched state. The encoder 57 is therefore caused to produce logic "1" signals at the output terminals $Y_1, Y_2, \ldots$ successively. Until the switch unit $S_i$ is caused to shift from the first state to the second state thereof, the switch units $S_1, S_2, \ldots S_{i-1}$ are shifted back from the second states to the first states thereof and accordingly the set-reset flip-flop circuits $F_1, F_2, \ldots F_{i-1}$ which have once been reset are set and produce logic "1" signals at their respective inverted output terminal $\overline{Q}$. It follows that the logic "AND" gate circuits $A_1, A_2, \ldots A_{i-1}$ are caused to produce logic "0" output signals in response to the logic "1" output signals delivered from the inverted output terminal $\overline{Q}$ of the trigger flip-flop circuits $G_1, G_2, \ldots G_{i-1}$. The encoder 57 is in this manner, finally caused to produce a logic "1" signal from its output terminal $Y_i$ allocated to the ith standardized size of the disc D being inserted into the casing structure 1. The logic "1" signal thus delivered from the output terminal $Y_i$ of the encoder 57 is fed to the driver circuit $D_i$ and causes the coil $C_i$ of the solenoid-operated actuator unit 53 for the disc stop elements $P_i$ and $P'_i$ (FIGS. 12 and 13) to be energized from the power source $V_{cc}$. The disc stop elements $P_i$ and $P'_i$ are accordingly driven to protrude upwardly through the apertures $H_i$ and $H'_i$, respectively, in the carrier plate 31 so that the record disc D being inserted into the casing structure 1 is brought into abutting contact at its leading arcuate edge portion with the disc stop elements $P_i$ and $P'_i$ and is prevented from being further moved into the casing structure 1. When the record disc D is in this fashion brought to a stop in a predetermined position within the casing structure 1, the beam of light emanating from the light emitter element $E_i$ (FIG. 14) is intercepted by the record disc D so that the associated light-sensitive transducer element or phototransistor $T_i$ produces a logic "0" output signal at its emitter. The logic "0" signal thus appearing at the emitter of the phototransistor $T_i$ is supplied to the wave shaping circuit $W_i$ and the signal produced by the wave shaping circuit $W_i$ is supplied to the negative-logic input terminal of the logic "AND" gate circuit $B_i$. In the presence of a logic "1" signal at the output terminal $Y_i$ of the encoder 57, the signal produced by the wave shaping circuit $W_i$ is passed through the logic "AND" gate circuit $B_i$ to the logic "NOR" gate circuit 58 and, through the gate circuit 58, to the motor drive circuit 59. The motor 50 is now actuated to drive the carrier plate 31 from the predetermined foremost position toward the predetermined rearmost position thereof within the casing structure 1.

Figure 15:
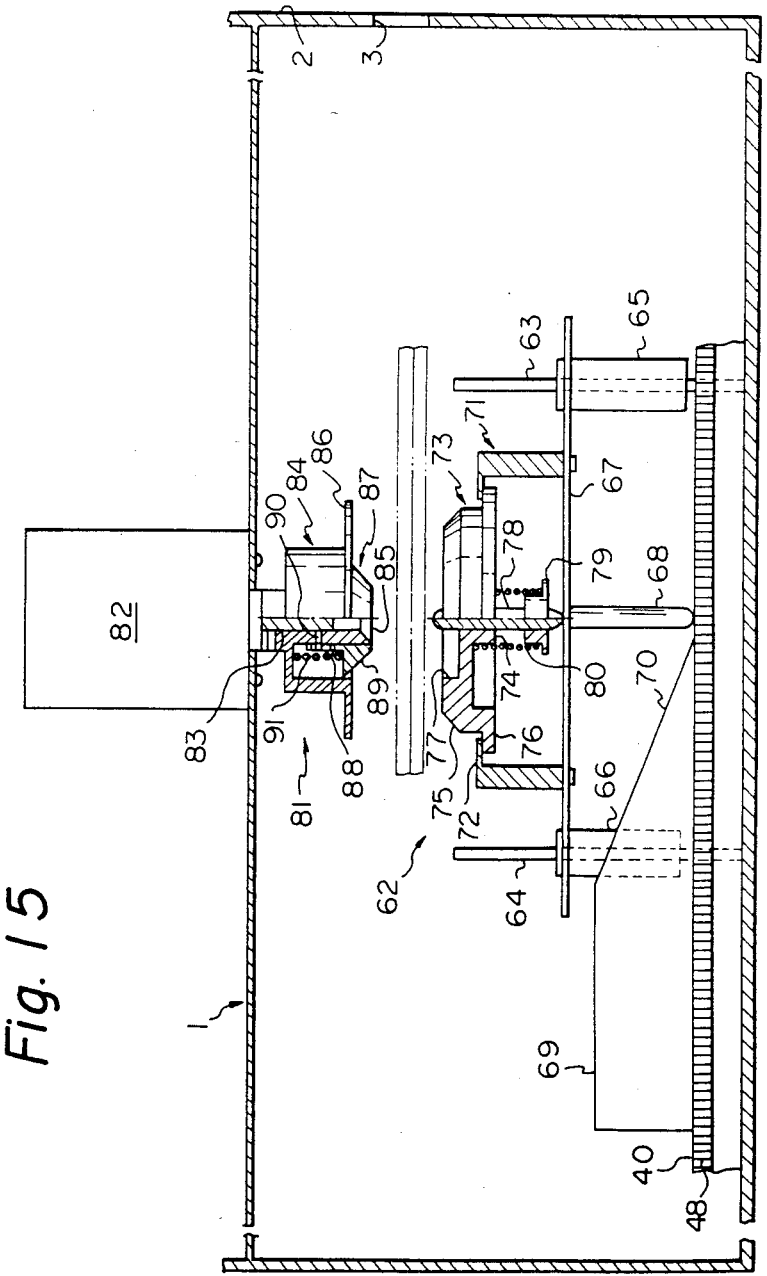
FIG. 15 is a side elevation view showing, partially in vertical section, a preferred example of disc clamp means forming part of the automatic disc loading apparatus embodying the present invention.

The automatic disc loading apparatus embodying the present invention further comprises a disc clamping assembly 62 (FIG. 15) adapted to have the record disc D clamped in a position ready to be driven for rotation about an axis fixed with respect to the casing structure 1 for being played back. Referring to FIG. 15, such a disc clamping assembly 62 is provided in combination with four guide posts 63 and 64 (only two of which are shown) upstanding from the bottom panel portion of the casing structure 1 and located symmetrically with respect to the axis about which the record disc D is to be driven for rotation within the casing structure 1. The disc clamping assembly 62 comprises sleeves 64 and 66 which are slidably received on these guide posts 63 and 64, respectively, and which are thus movable upwardly and downwardly above the bottom panel portion of the casing structure 1. A disc-shaped support plate 67 is horizontally secured to these sleeves 65 and 66 and is thus movable together with the sleeves 65 and 66 upwardly and downwardly above the bottom panel portion of the casing structure 1. A cam follower rod 68 projects downwardly from the lower face of the support plate 67 toward the upper face of the previously described slider plate 40 and is located in alignment with the above mentioned axis of rotation of the record disc D. The slider plate 40 is positioned below the support plate 67 and has fixedly attached to the upper face thereof a cam member 69 having a cam surface portion 70 aligned with the cam follower rod 68 and slanting downwardly and forwardly with respect to the casing structure 1. The cam follower rod 68 and accordingly the support plate 67 are thus moved upwardly above the slider plate 40 when the slider plate 40 is driven to move forwardly with respect to the casing structure 1 with the cam follower rod 68 received on the cam surface portion 70 of the cam member 69. The support plate 67 has fixedly carried on the upper face thereof a cylindrical retaining member 71 having an inner flange portion 72 at the upper end thereof. A disc clamp member 73 has a central hub portion 74 formed with an axial bore aligned with the cam follower rod 68, an annular portion 75 coaxially surrounding the central hub portion 74 and having a flat, horizontal upper face, and an outer flange portion 76 radially projecting upwardly from the annular portion 75 and engageable with the lower face of the inner flange portion 72 of the retaining member 71. The annular portion 75 has a chamfered or bevelled outer and upper edge and is formed with a circular depression 77 which is open upwardly. A center shaft 78 is slidably passed through the axial bore in the central hub portion 74 and has a lower portion projecting downwardly from the hub portion 74 of the retaining member 71. The center shaft 78 is urged downwardly to abut against the upper face of the support plate 67 and accordingly the clamp member 73 is urged upwardly to have its outer flange portion 76 pressed against the lower face of the inner flange portion 72 of the retaining member 71 by suitable biasing means. In the arrangement shown in FIG. 15, such biasing means comprises a spring seat member 79 fixedly attached to the lower portion of the center shaft 78 and a preloaded helical compression spring 80 seated at one end thereof on the upper face of the spring seat member 79 and at the other end thereof on the lower face of the clamp member 73. When the center shaft 78 is pressed against the upper face of the support plate 67 with the outer flange portion 76 of the clamp member 73 pressed against the inner flange portion 72 of the retaining member 71 by the force of the spring 74, an upper end portion of the center shaft 78 projects upwardly through the depression 77 in the clamp member 73 as shown. The diameter of the annular portion 75 is equal to the diameter of record discs having central holes with a relatively large standardized diameter.

Above the disc clamping assembly 62 thus constructed and arranged is provided a turntable assembly 81 which is connected to and to be driven for rotation by a disc drive motor 82 mounted on the upper panel portion of the casing structure 1. The motor 82 has an output shaft 83 axially aligned with the center shaft 78 of the disc clamping assembly 62 and accordingly with the axis of rotation of the recrod disc D and projecting downwardly through an opening formed in the upper panel portion of the casing structure 1 as shown. The turntable assembly 81 comprises a drive member 84 having a central sleeve portion 85 formed with an axial bore into which the output shaft 83 of the disc drive motor 82 is forced so that the drive member 84 is rotatable with the motor output shaft 83. The drive member 84 further has an outer and lower annular portion 86 coaxially surrounding the central sleeve portion 85 and having a flat, horizontal lower face located above the flat upper face of the annular portion 75 of the clamp member 73. The turntable assembly 81 further comprises an annular centering member 87 having a central sleeve portion 88 formed with an axial bore and a lower frusto-conical portion 89 having a flat, horizontal lower face and tapered downwardly. The central sleeve portion 88 of the centering member 87 has the central sleeve portion 85 of the drive member 84 slidably received in the axial bore in the sleeve portion 88 so that the centering member 87 is movable upwardly and downwardly with respect to the drive member 84. The central sleeve portion 88 of the centering member 87 is further formed with a vertically elongated slot into which a pin 90 projecting radially from the central sleeve portion 85 of the drive member 84 so that the centering member 87 is rotatable with the drive member 84. The centering member 87 is urged downwardly with respect to the driving member 84 by suitable biasing means which is shown comprising a preloaded helical compression spring 91 seated at one end thereof on the lower face of an upper wall portion of the drive member 84 and at the other end on the upper face of the lower frusto-conical portion 89 of the centering member 87. The disc clamping assembly 72 and turntable assembly 81 constructed and arranged as described above are positioned respectively above and below the path of the carrier plate 31 between the predetermined foremost and rearmost positions thereof as indicated by dots-and-dash lines in FIG. 15. The output shaft 83 of the disc drive motor terminates approximately halfway in the axial bore in the central bore portion 85 of the drive member 84 as shown so that an upper end portion of the center shaft 78 can be admitted upwardly into the bore in the sleeve portion 85 when the clamp member 73 is moved upwardly.

Figure 16:
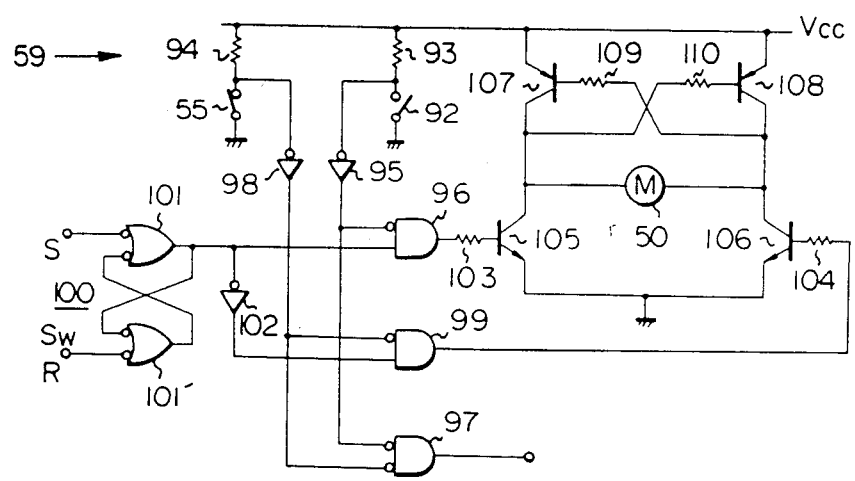
FIG. 16 is a diagram showing a preferred example of a motor drive circuit included in the control circuit shown in FIG. 14.

FIG. 16 shows the circuit arrangement of the motor drive circuit 59 schematically illustrated in FIG. 14. The motor drive circuit 59 comprises a disc clamp responsive switch 92 provided in parallel with the carrier position responsive switch 55 described in connection with the control circuit shown in FIG. 14. The disc clamp responsive switch 92 is responsive to a condition in which a record disc is clamped between the above described disc clamping assembly 62 and turntable assembly 81. More particularly, the switch 92 is provided in conjunction with the slider plate 40 (FIG. 1) and is adapted to close when the slider plate 40 carrying the cam member 69 thereon (FIG. 15) reaches a predetermined foremost position with respect to the casing structure 1 and accordingly the disc clamping assembly 62 is driven to move into contact with the carrier plate 31 moved to the predetermined rearmost position thereof. The switch 92 may thus be arranged to be engaged by the slider plate 40 when the slider plate 40 is moved to the predetermined foremost position thereof. The disc clamp responsive switch 92 and the above mentioned carrier position responsive switch 55 are grounded each at one end thereof and connected at the other end thereof to a constant-voltage power source $V_{cc}$ through resistors 93 and 94, respectively. The resistor 93 intervening between the switch 93 and the power source $V_{cc}$ is connected through a logic inverter 95 to a negative-logic input terminal of a logic "AND" gate circuit 96 and one input terminal of a logic "AND" gate circuit 97 of the negative logic type, while the resistor 94 intervening between the switch 55 and the power source $V_{cc}$ is connected through a logic inverter 98 to a negative-logic input terminal of a logic "AND" gate circuit 99 and the other input terminal of the logic "AND" gate circuit 97. The motor drive circuit 59 further comprises a set-reset flip-flop circuit 100 composed of, for example, a pair of cross-connected logic "NAND" gate circuits 101 and 101'. The set-reset flip-flop circuit 100 has a set terminal S connected to the output terminal of the logic "NOR" gate circuit 58 in the control circuit shown in FIG. 14 and a reset terminal R connected to a source (not shown) of a disc withdrawal signal $S_w$ to be produced upon completion of a playback operation or when a playback operation is to be interrupted before the operation comes to an end. The set-reset flip-flop circuit 100 thus arranged has its output terminal connected to a positive-logic input terminal of the logic "AND" gate circuit 96 and by way of a logic inverter 102 to the other input terminal of the logic "AND" gate circuit 97. The logic "AND" gate circuit 97 has its output terminal connected to the logic "NOR" gate circuit 60 in the control circuit shown in FIG. 14. On the other hand, the logic "AND" gate circuits 96 and 99 have their output terminals connected through resistors 103 and 104 to the bases of transistors 105 and 106, respectively, each having its emitter grounded. These transistors 105 and 106 have collectors connected to the collectors of transistors 107 and 108, the emitter of each of the transistors 107 and 108 being connected to the constant-voltage source $V_{cc}$. The collector of the transistor 105 is further connected through a resistor 109 to the base of the transistor 108 and, likewise, the collector of the transistor 106 is further connected through a resistor 110 to the base of the transistor 107. The coil of the motor 50 described with reference to FIGS. 1 and 14 is connected between the respective collectors of the transistors 105 and 106 and accordingly between the respective collectors of the transistors 107 and 108.

When the record disc D inserted into the casing structure 1 reaches the position abutting against the disc stop elements $P_i$ and $P'_i$ projecting upwardly from the upper face of the carrier plate 31 (FIGS. 12 and 13), the logic "NOR" gate circuit 58 produces a logic "1" output signal as described in connection with the control circuit shown in FIG. 14. The logic "1" output signal from the logic "NOR" gate circuit 58 is fed to the set terminal S of the set-reset flip-flop circuit 100 of the above described motor drive circuit 59 and causes the flip-flop circuit 100 to deliver a logic "1" signal to the positive-logic input terminal of the logic "AND" gate circuit 96. The logic "1" signal appearing at the output terminal of the flip-flop circuit 100 is inverted by the logic inverter 102 and the resultant logic "0" signal is supplied to the positive-logic input terminal of the logic "AND" gate circuit 97. The disc clamp responsive switch 92 being maintained open and the carrier position responsive switch 55 being closed at this stage, a logic "1" signal is present at the negative-logic input terminal of the logic "AND" gate circuit 96 and at one input terminal of the logic "AND" gate circuit 97, and a logic "0" signal is present at the other input terminal of the logic "AND" gate circuit 97 and the negative-logic input terminal of the logic "AND" gate circuit 99. Under these conditions, the transistors 105 and 107 are rendered states conductive states so that the carrier drive motor 50 is put into operation having its output shaft driven in one direction. Even though flip-flop circuit 100 is set by the output signal from NOR gate 58 and motor 50 starts to rotate, flip-flop circuit 100 may also be set or reset by a manual switch (not shown) so that motor 50 can be started at a desired time by an operator to introduce disc D into the casing structure 1. The rotation of the output shaft of the motor 50 is transmitted through the power transmission means 51 (FIG. 1) to the pinion gear 49 and attempts to drive the rack member 34 forward with respect to the casing structure 1. It follows that the carrier plate 31 is forced to move rearwardly and the slide plate 40 integral with or secured to the rack member 34 is thus forced to move forwardly with respect to the casing structure 1. Since, however, the the cam follower element 47 is, under these conditions, located in the cam-forming portion 45a of the key groove 45 in the slide plate 40 and since, furthermore, the stop pin 38 on the control lever 39 is held in contact with the inner side edge of the rotation preventive plate 36 and prohibits the control lever 39 from being turned about the center axis of the rear guide rod 44, the slide plate 40 is not permitted to move forwardly with respect to the casing structure 1 so that the carrier plate 31 is caused to move rearwardly from the predetermined foremost position thereof with respect to the casing structure 1. When the carrier plate 31 is thus initiated into motion to move forwardly from the foremost position thereof, the carrier position responsive switch 55 which has been engaged by one of the guide members 32 and 32' or 33 and 33' is disengaged therefrom and is allowed to open. The switch 55 being thus made open, the encoder 57 of the control circuit shown in FIG. 14 is unlatched.

When the carrier plate 31 reaches the predetermined rearmost position thereof with respect to the casing structure 1 and accordingly the record disc D carried on the carrier plate 31 is moved to a position having its center axis aligned with the axis of rotation the turntable assembly 81 (FIG. 15), the recess 37 formed in the rotation preventive plate 36 (FIG. 1) is located on the arcuate path of the stop pin 38 on the control lever 39, permitting the control lever 39 to turn about the center axis of the guide pin 44. The control lever 39 is therefore caused to turn about the center axis of the guide pin 44 by the slide plate 40 so that the cam follower element 47 is moved out of the cam-forming portion 45a of the key groove 45 in the slide plate 40. The cam follower element 47 being received in a straight portion of the key groove 45, the slide plate 40 is now permitted to move forwardly with respect to the casing structure 1 and, at the same time, the carrier plate 31 is brought to a stop in the predetermined rearmost position thereof with the stop pin 38 received in the recess 37.

The slider plate 40 being driven to move forwardly in the casing structure 1 with the carrier plate 31 held in the predetermined rearmost position thereof as described above, the cam follower rod 68 of the disc clamping assembly 62 shown in FIG. 15 is received on the cam surface portion 70 of the cam member 69 and is thus caused to slide on the cam surface portion 74 and to rise as the cam member 69 is moved forwardly with the slider plate 40. As the cam follower rod 68 is in this manner raised above the slider plate 40, the disc clamping assembly 62 as a whole is driven to move upwardly toward the carrier plate 31 and has the clamp member 73 brought into pressing contact with the lower face of the record disc D through the U-shaped slot 35 (FIG. 1) in the carrier plate 31. When the clamp member 73 is thus brought into contact with the record disc D on the carrier plate 31, an upper end portion of the center shaft 78 is inserted into the axial bore in the central sleeve portion 85 of the drive member 84 of the turntable assembly 81 through the depression 77 in the clamp member 73 and the center hole in the record disc D. As the slider plate 40 is further moved forwardly and as a consequence the cam follower rod 68 is further moved upwardly, the retaining member 71 is further moved upwardly with respect to the clamp member 73 held against the lower face of the record disc D and has its inner flange portion 72 spaced apart upwardly from the outer flange portion 76 of the clamp member 73. The record disc D is now clamped between the upper face of the clamp member 73 and the lower annular portion 86 of the drive member 84 and is ready to be driven for rotation with the clamp member 73 and the turntable assembly 81 by the disc drive motor 82.

Figure 17:
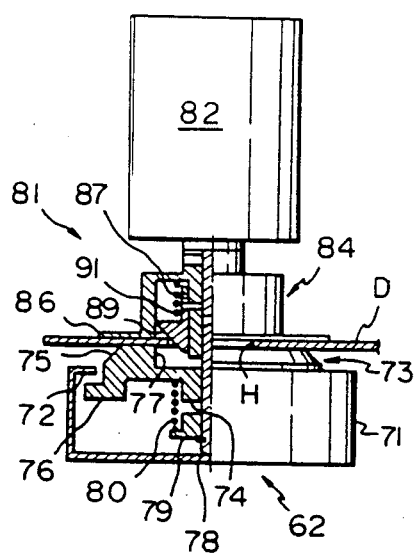
FIG. 17 is a side elevation view showing, partially in vertical section, the disc clamp means in a condition having clamped a record disc having a relatively small center hole.
Figure 18:
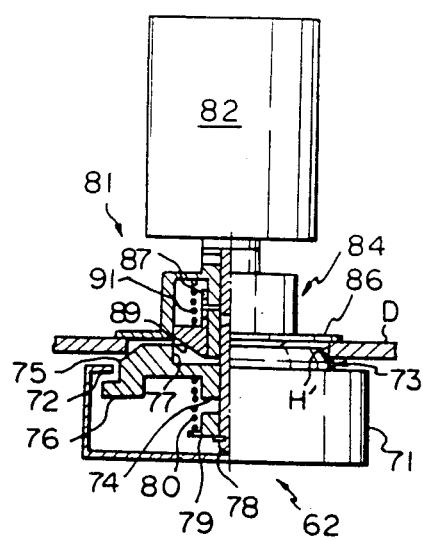
FIG. 18 is a side elevation view showing, partially in vertical section, the disc clamp means in a condition having clamped a record disc having a relatively large center hole.

FIGS. 17 and 18 show two different conditions of the above described disc clamping assembly 62 and turntable assembly 81 having the record disc D clamped therebetween. The record disc D clamped in the arrangement shown in FIG. 17 is assumed to be a digital audio disc commonly called a "compact disc" and having a relatively small center hole H while the record disc D clamped in the arrangement shown in FIG. 18 is assumed to be a video disc having a relatively large center hole H'. The lower frusto-conical portion 89 of the centering member 87 is larger in overall diameter than the center hole H in the digital audio disc D and is smaller in overall diameter than the center hole H' in the video disc D. The chamfered or bevelled edge of the annular portion 75 of the clamp member 73 is approximately equal in diameter to the center hole H' in the video disc. In the arrangement shown in FIG. 17, the lower frusto-conical portion 89 of the centering member 87 therefore has its tapered surface held in contact with the circular edge defining the center hole H in the record disc D and thereby has the record disc D positioned to have its center axis correctly aligned with the axis of rotation of the output shaft 83 of the motor 82 and the center axis of the center shaft 78. On the other hand, the lower frusto-conical portion 89 of the centering member 87 in the arrangement shown in FIG. 18 has its tapered surface coaxially radially spaced apart inwardly from the circular edge defining the center hole H' in the record disc D. The edge defining the center hole H' is received on the chamfered or bevelled edge of the annular portion 75 of the clamp member 73 so that the record disc D is positioned to have its center axis correctly aligned with the axis of rotation of the output shaft 83 of the motor 82 and the center axis of the center shaft 78.

When the record disc D is clamped between the disc clamping assembly 62 and turntable assembly 81 as above described, the disc clamp responsive switch 92 (FIG. 16) is caused to close due to the abutment thereof with the slider plate 40 so that the transistors 105 and 107 of the motor drive circuit 59 shown in FIG. 16 are rendered into non-conductive states. The carrier drive motor 50 is deenergized and is thus brought to a full stop. The record disc D is now ready to be played back.

Upon completion of the playback operation or when the playback operation is terminated before the playback operation comes to an end, a disc withdrawal signal $S_w$ is fed to the reset terminal R of the set-reset flip-flop circuit 100 of the motor drive circuit 59 shown in FIG. 16. The carrier position responsive switch 55 being maintained open under such a condition, the transistors 106 and 108 are now rendered into conductive states so that the carrier drive motor 54 is put into operation driving its output shaft for rotation in the reverse direction. The carrier plate 31 is thus driven backwardly from the predetermined rearmost position to the predetermined foremost position thereof by a reversal of the events previously described.

Figure 19:
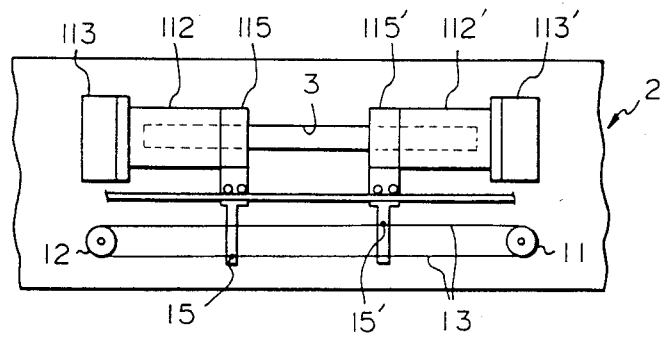
FIG. 19 is a fragmentary front end view showing an alternative example of the disc guide means of the automatic disc loading apparatus embodying the present invention.
Figure 20:
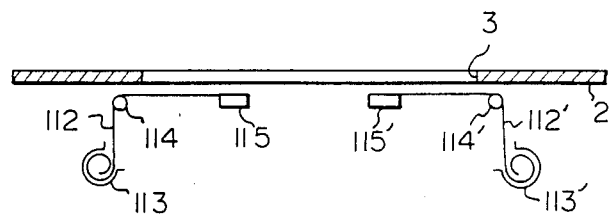
FIG. 20 is a sectional view taken along line XX—XX in FIG. 21.

While the disc guide members 18 and 18' of the disc guide means provided in the embodiment hereinbefore described are each in the form of a rod having a circular cross section, such disc guide members 18 and 18' may be replaced with first and second guide members of flexible strips as indicated at 112 and 112', respectively, in FIGS. 19 and 20. The guide members 112 and 112' of the flexible strips are helically wound in retainers 113 and 113', respectively, fixedly held in position within the casing structure 1 (FIGS. 1 to 3) and are turned to extend in parallel with the slot 3 past rollers 114 and 114' located at the rear of the slot 3. The guide members 112 and 112' thus arranged have contact elements 115 and 115' which are securely attached to their respective leading end portions and which are located each in part on the plane on which a record disc D is to be inserted into the casing structure 1 through the slot 3. One of these contact elements 115 and 115' is secured to the upper straight travelling portion of the looped wire 13 and the other of the contact elements 115 and 115' is secured to the lower straight travelling portion of the wire 13 as shown in FIG. 19. When the looped wire 13 is driven to travel between the driving and driven pulleys 11 and 12, one of the contact elements 115 and 115' is caused to move toward the driving pulley 11 and the other of the contact elements 25 and 25' is caused to move toward the driven pulley 12, with the result that one of the guide members 112 and 112' is pulled and unwound out of the associated one of the retainers 113 and 113' and the other of the guide members 112 and 112' is withdrawn and re-wound into the associated retainer. The contact elements 115 and 115' are in this fashion moved toward or away from each other with respect to the casing structure 1. The guide members 112 and 112' of the flexible strips as above described may further be replaced with guide members of straight, rigid strips (not shown) which are arranged to extend in a lateral direction of the casing structure 1, provided the casing structure 1 has such a lateral measurement as to allow accommodation of the movement of such elongated guide members. In this instance, the retainers 113 and 113' and rollers 114 and 114' may be replaced with suitable members or elements adapted to guide the guide members along the slot 3.

Figure 21:
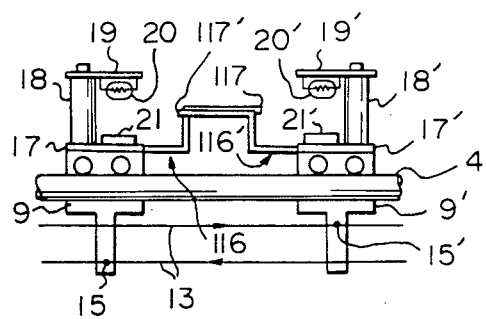
FIG. 21 is a front end view showing an alternative example of the home position determining means shown in FIG. 10.

As an alternative to the home position determining means comprising the shield plate 28 as shown in FIG. 10, the home position determining means of an automatic disc loading apparatus according to the present invention may comprise first and second shield plates 116 and 116' movable with the first and second carriage members 9 and 9', respectively, as shown in FIG. 21. The first and second shield plates 116 and 116' are securely mounted on the carriage members 9 and 9', respectively, and have end portions 117 and 117', respectively, which are located on a plane intervening between each of the light emitter elements 20 and 20' and each of the light-sensitive transducer elements 21 and 21'. Each of the first and second shield plates 116 and 116' extends toward the area between the light emitter and transducer elements on the carriage member supporting the other shield plate and is sized and/or shaped in so that the respective end portions 117 and 117' thereof are located to intercept the beams of light from the first and second light emitter elements 20 and 20' when the first and second carriage members 9 and 9' are spaced apart the predetermined minimum distance from each other.

If desired, furthermore, a disc loading apparatus according to the present invention may further comprise suitable display means such as light-emissive diodes (not shown) to be activated by the output signals $Y_1$, $Y_2$, ... $Y_n$ from the encoder 57 of the control circuit shown in FIG. 14.

Figure 22:
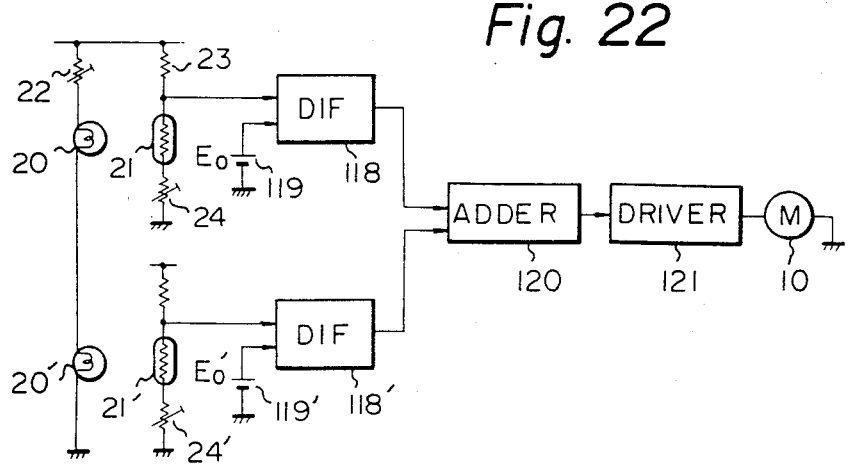
FIG. 22 is a diagram showing an alternative example of the motor drive circuit shown in FIG. 16.
Figure 23:
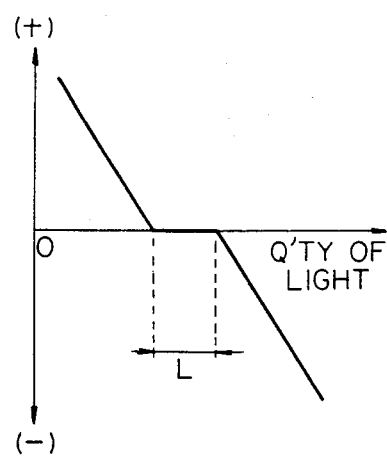
FIG. 23 is a graph showing an example of the performance characteristic of differential signal generators included in the motor drive circuit shown in FIG. 22.

FIGS. 22 and 23 show an alternative example of the motor drive circuit shown in FIG. 8. In FIG. 22, those elements which have their counterparts in the circuit of FIG. 8 are denoted by like reference numerals. In the motor drive circuit herein shown, the light emitter elements 20 and 20' are also connected in series between a constant-voltage power source $V_{cc}$ and ground through a current-limiting semi-adjustable resistor 22. On the other hand, the first light-sensitive transducer element 21 is connected between the power source $V_{cc}$ and ground through a series combination of a resistor 23 and a semi-adjustable resistor 24 and, likewise, the second light-sensitive transducer element 21' is connected between the power source $V_{cc}$ and ground through a series combination of a resistor 23' and a semi-adjustable resistor 24'. Each of the light-sensitive transducer elements 21 and 21' is constituted by, for example, a CdS photoconductor to exhibit a resistance variable with the quantity of the light incident thereon. The node between the first light-sensitive transducer element 21 and the associated resistor 23 and the node between the second light-sensitive transducer element 21' and the associated resistor 23' constitute output terminals of the transducer elements 21 and 21, respectively, so that potentials varying with the movement of the record disc D with respect to the disc guide members 18 and 18' appear at these terminals. These output terminals of the light-sensitive transducer elements 21 and 21' are connected to first and second differential signal generators 118 and 118', respectively. The differential signal generators 118 and 118' have input terminals connected to sources 119 and 119' of reference signals Eo and E'o, respectively, and are thus adapted to compare the output signals from the first and second light-sensitive transducer elements 21 and 21' with these reference signals Eo and E'o, respectively, and to produce output signals indicative of the differences therebetween. These reference signals Eo and E'o and the resistance values of the semi-adjustable resistors 24 and 24' are selected in such a manner that each of the differential signal generators 118 and 118' produces an output voltage of about zero volt when the associated transducer element 21 or 21' is irradiated with light over approximately one half of its light sensitive area. The relationship thus achieved between the quantity of light incident on each of the light-sensitive transducere elements 21 and 21' and the resultant output voltage from each of the differential signal generators 118 and 118' is illustrated in FIG. 23. As will be seen from FIG. 23, each of the differential signal generators 118 and 118' produces an output voltage of zero volt without respect to the quantity of light incident on the associated transducer element 21 or 21' when the quantity of light is within a predetermined range L. The differential signal generators 118 and 118' have their output terminals connected to input terminals of an adder 120 adapted to produce an output signal representative of the sum of the signal voltages from the differential signal generators 118 and 118'. The output signal thus produced by the adder 120 is fed to a motor driver circuit 121 having its output terminal connected to the coil of the drive motor 10, which is thus operative to drive its output shaft in either direction in response to the output signal from the adder 120.

When, now, the record disc D is inserted along a correct path into the casing structure 1 through the slot 3, a leading arcuate portion of the record disc D enters the area between the first light emitter element 20 and first light-sensitive transducer element 21 and the area between the second light emitter element 20' and second light-sensitive transducer element 21'. The beams of light emanating from the first and second light emitter elements 20 and 20' toward the first and second light-sensitive transducer elements 21 and 21', respectively, are therefore intercepted by the leading arcuate portion of the record disc D so that the quantity of light incident on each of the transducer elements 21 and 21' decreases gradually. As the quantities of light respectively incident on the transducer elements 21 and 21' thus decrease, the negative voltages which have been present at the respective output terminals of the first and second differential signal generators 118 and 118' are shifted to positive voltages through the zero levels. It therefore follows that the output voltage from the adder 120 is shifted from the zero level to a positive level and actuates the drive motor 10 into operation driving its output shaft in, for example, the direction of the arrow $D_1$ in FIG. 3. This causes the looped wire 13 to travel in the direction of the arrowheads $d_1$ and as a consequence the first and second carriage members 9 and 9' and accordingly the first and second light-sensitive transducer elements 21 and 21' are caused to move away from each other. Such movement of the light-sensitive transducer elements 21 and 21' gives rise to an increase in the quantity of light incident on each of the transducer elements 21 and 21'. The result is that the output voltage from one of the differential signal generators 118 and 118' is shifted from a positive level to a negative level through the zero level and, as a consequence, the respective output voltages from the first and second differential signal generators 118 and 118' are cancelled by each other. The adder 120 thus produces an output voltage of zero volt and brings the drive motor 10 to a stop. As the record disc D is further moved into the casing structure 1 through the slot 3, the beams of light emitted from the light emitter elements 20 and 20' are for a second time partially intercepted by the record disc D so that the respective output voltages from the transducer elements 21 and 21' are shifted from negative levels to positive levels through the zero levels with the result that the drive motor 10 is for a second time actuated to drive its output shaft in the direction of the arrow $D_1$ (FIG. 3). When, conversely, the record disc D is being withdrawn from the casing structure 1 past the light sensitive transducer elements 21 an 21', the quantities of light respectively incident on the transducer elements 21 and 21' become maximal so that the output voltages from the first and second differential signal generators 118 and 118' are equalized with the voltage from the constantvoltage power source $V_{cc}$. Under these conditions, the adder 120 produces a negative output voltage as will be seen from FIG. 23 so that the drive motor 10 is caused to drive the carriage members 9 and 9' to move toward each other.

The record disc D inserted into the casing structure 1 as above described reaches a position in which one of the beams of light emanating from the light emitter elements 20 and 20' is intercepted by one of the end portions 29 and 29' of the shield plate 28 shown in FIG. 10 or one of the respective end portions 117 and 117' of the shield plates 116 and 116' shown in FIG. 21. The result is that the output voltage from one of the first and second differential signal generators 118 and 118' shown in FIG. 22 is shifted from a positive level to a negative level through the zero level. The adder 120 is thus caused to produce an output voltage of zero level and brings the drive motor 10 to a full stop. The minimum distance between the carriage members 9 and 9' (FIGS. 1 to 4) is determined in this fashion.

What is claimed is:

1. In a disc player having a casing structure provided with a disc insertion slot, a turn-table assembly, a pick-up assembly associated with said turn-table assembly for playing back an information disc mounted on said turn-table assembly, and loading means for conveying said information disc from said disc insertion slot along a predetermined plane on a straight line until the center of said disc is aligned with the center of a playing position of the turn-table assembly, said loading means including a carrier plate movable along said predetermined plane and said straight line, for conveying thereon said information disc toward and away from said turn-table assembly, said turn-table assembly includes:

a drive member mounted on said casing structure so as to be rotatable about a rotational axis and having a disc support surface facing downwardly; and a disc clamp assembly movable up and down along said rotational axis with respect to said casing structure, for clamping said information disc on said disc support surface when it is actuated upwardly and releasing said information disc from said disc support surface when it is actuated downwardly; and a slider plate slidable with respect to said casing structure along said predetermined plane and having a cam surface engaged with said clamp assembly so as to actuate said clamp assembly upwardly when said slider plate moves along said plane;

actuating means connected to said carrier plate and said slider plate, for urging said carrier plate and said slider plate in opposite directions to each other; and latch means, connected to said carrier plate and said slider plate, for engaging said slider plate when said carrier plate is moved rearwardly and releasing said slider plate when said carrier plate is moved to a rearmost position.

2. A disc player as defined by claim 1, in which said drive member has a cylindrical concavity therein which opens at the disc support surface toward said clamp assembly; a centering member slidable in said concavity; and an elastic element provided with said concavity, for urging said centering member to protrude toward said disc clamping assembly, said centering member having an annular bevelled surface portion tapering toward said disc clamping assembly and having predetermined minimum and maximum diameters.

3. A disc player as defined by claim 2, in which said disc clamp assembly includes a support member provided within said casing structure and movable in opposite directions substantially normal to said predetermined plane, a cylindrical retaining member mounted on an upper face of said support plate and having an inner flange portion at an upper end thereof, a disc clamp member having an annular flange portion confronting an inner surface of said inner flange portion, a central shaft slidably mounted within an axial bore of said disc clamp member, a spring connected with said central shaft and said disc clamp member for urging said central shaft and said disc clamp member away from each other whereby the lower end of said central shaft abuts said support member and said annular flange portion abuts said inner surface of said inner flange portion; a cam follower member having one end thereof connected to said support member and the other end abutting said cam surface of said slider plate.

4. A disc player as defined by claim 3, in which said disc clamp member is formed with a bevelled outer edge portion and a bevelled upper edge portion and a circular depression opening upwardly to be engageable with said centering member.

5. A disc player as defined by claim 3, in which said central shaft is engageable with a tapered central bore formed on the surface of said centering member.

6. A disc player as defined by claim 1, in which said slider plate is provided with a rack gear, and said actuating means includes a motor mounted on said carrier plate, a pinion gear meshed with said rack gear, and a power transmission assembly for transmitting torque of said motor to said pinion gear.

7. A disc player as defined by claim 1, in which said latch means includes a control lever pivotally mounted at one end thereof on said casing structure, a latch pin mounted on an end of said control lever and engaged with a generally L-shaped key groove of said slider plate, a control pin mounted on another end of said lever and slidably attached to a slide surface formed on said carrier plate, said slide surface being provided with a latch release recess, and bias means for urging said control lever to engage said latch pin to latch said slider plate as long as said control pin engages a portion of said slide surface other than said latch release recess, whereby said latch pin release said slide plate and said control pin engage with said latch release recess to latch said carrier plate.

* * * * *